(12) United States Patent
Cottier

(10) Patent No.: US 11,135,581 B2
(45) Date of Patent: Oct. 5, 2021

(54) METHODS AND ASSEMBLIES FOR MOLECULE RECOVERY

(71) Applicant: Creoptix AG, Wädenswil (CH)

(72) Inventor: Kaspar Cottier, Wàdenswil (CH)

(73) Assignee: Creoptix SA, Wädenswil (CH)

( * ) Notice: Subject to any disclaimer, the term of this patent is extended or adjusted under 35 U.S.C. 154(b) by 299 days.

(21) Appl. No.: 16/079,931

(22) PCT Filed: Apr. 25, 2017

(86) PCT No.: PCT/IB2017/052353
§ 371 (c)(1),
(2) Date: Aug. 24, 2018

(87) PCT Pub. No.: WO2017/187325
PCT Pub. Date: Nov. 2, 2017

(65) Prior Publication Data
US 2019/0046982 A1   Feb. 14, 2019

(30) Foreign Application Priority Data

Apr. 29, 2016   (CH) .................................... 00571/16

(51) Int. Cl.
| | |
|---|---|
| *B01L 99/00* | (2010.01) |
| *G01N 1/40* | (2006.01) |
| *B01L 3/00* | (2006.01) |

(52) U.S. Cl.
CPC ... *B01L 3/502715* (2013.01); *B01L 3/502746* (2013.01); *G01N 1/40* (2013.01);
(Continued)

(58) Field of Classification Search
None
See application file for complete search history.

(56) References Cited

U.S. PATENT DOCUMENTS

| 5,786,209 A | 7/1998 | Newberg |
| 6,008,893 A | 12/1999 | Roos et al. |
| (Continued) | | |

FOREIGN PATENT DOCUMENTS

| CN | 1648671 A | 8/2005 |
| CN | 1696694 A | 11/2005 |
| (Continued) | | |

OTHER PUBLICATIONS

International Search Report for PCT/IB2017/052353 dated Aug. 4, 2017, 3 pages.

*Primary Examiner* — Paul S Hyun
(74) *Attorney, Agent, or Firm* — Blank Rome LLP

(57) ABSTRACT

According to the present invention there is provided a method of molecule recovery using an assembly which comprises a first flow cell (2) which comprises comprising first ligands (4) which can bind to molecules, and a conduit which can selectively fluidly connect the first flow cell to a collection reservoir (39); the method comprising the steps of (a) flowing a sample fluid along the conduit into the first flow cell (2); (b) flowing a buffer fluid through at least a portion of the conduit, without flowing any of the buffer fluid through the first flow cell (2) so that sample fluid is maintained in the first flow cell (2) but said at least a portion of the conduit is cleaned by the buffer fluid; (c) flowing a buffer fluid through the first flow cell (2) to flush the sample fluid out of the first flow cell (2); (d) lowing a fluid through the first flow cell (2), along the conduit, and into the collection reservoir, so that molecules of the sample fluid which were bound to first ligands (4) and which have become dissociated from the ligand (4) are collected into the fluid which flows through the first flow cell (2) and are brought to the collection reservoir. There is provided a corresponding method for recovering molecules which passively dissociate from first ligands (4), and, a corresponding (Continued)

method for recovering molecules which actively dissociate from first ligands (4). There is further provided corresponding assemblies which can be used to implement the above-mentioned methods.

12 Claims, 7 Drawing Sheets

(52) U.S. Cl.
CPC .. *B01L 2200/028* (2013.01); *B01L 2200/0621* (2013.01); *B01L 2200/0631* (2013.01); *B01L 2200/141* (2013.01); *B01L 2300/0877* (2013.01); *B01L 2400/0487* (2013.01); *B01L 2400/06* (2013.01); *B01L 2400/0622* (2013.01)

(56) References Cited

U.S. PATENT DOCUMENTS

| | | | |
|---|---|---|---|
| 7,385,040 B2 | 6/2008 | Johansson et al. | |
| 7,517,656 B2 | 4/2009 | Martin et al. | |
| 9,795,965 B2 | 10/2017 | Italiano et al. | |
| 9,851,347 B2 | 12/2017 | Cottier | |
| 10,705,091 B2 | 7/2020 | Miltenyi et al. | |
| 2005/0047973 A1 | 3/2005 | Schulz et al. | |
| 2006/0252087 A1 | 11/2006 | Tang et al. | |
| 2007/0207060 A1 | 9/2007 | Zou et al. | |
| 2012/0258475 A1 | 10/2012 | Tang et al. | |
| 2015/0157781 A1 | 6/2015 | Kyle et al. | |
| 2019/0126215 A1 | 5/2019 | Ichiki et al. | |

FOREIGN PATENT DOCUMENTS

| | | |
|---|---|---|
| CN | 1926146 A | 3/2007 |
| CN | 101535466 A | 9/2009 |
| EP | 1508369 A2 | 2/2005 |
| EP | 1593968 A2 | 11/2005 |
| JP | H07506430 A | 7/1995 |
| JP | H07509061 A | 10/1995 |
| JP | 2007/089566 A | 4/2007 |
| JP | 2014100588 A | 6/2014 |
| JP | 2014/128268 A | 7/2014 |
| JP | 2015/522151 A | 8/2015 |
| JP | 2016/510212 A | 4/2016 |
| WO | WO-2004/109284 A1 | 12/2004 |
| WO | WO-2005/030925 A2 | 4/2005 |
| WO | WO-2014/009286 A1 | 1/2014 |
| WO | WO-2015/046263 A1 | 3/2017 | her
METHODS AND ASSEMBLIES FOR MOLECULE RECOVERY

RELATED APPLICATION

This application is a national phase of PCT/IB2017/052,353, filed on Apr. 25, 2017, which claims the benefit of Swiss Application No. CH100571/16, filed on Apr. 29, 2016. The entire contents of these applications are hereby incorporated by reference.

FIELD OF THE INVENTION

The present invention concerns methods and assemblies for molecule recovery; and in particular methods and assemblies for recovering molecules bound to ligands, with reduced contamination.

DESCRIPTION OF RELATED ART

In existing methods a sample fluid under test is passed through a flow cell, such as the flow cell of a sensor, or an affinity purification column, which comprises ligands. The ligands bind to molecules which have a predefined characteristic, for example having a high affinity or attraction to the ligands. Thus it can be determined which molecules in the sample fluid have said predefined characteristic of having a high affinity or attraction to the ligands, by identifying which molecules have become bound to the ligands.

In order to identifying which molecules have become bound to the ligands, the molecules which are bound to the ligands are collected using a buffer fluid. The buffer fluid flows into the flow cell where is collects the molecules which are bound to the ligands; and then the buffer fluid containing the collected molecules flows along a conduit from the flow cell to a mass spectrometer; at the mass spectrometer the buffer fluid containing the collected molecules is analyzed to identify the molecules contained in the buffer fluid. Identifying the molecules contained in the buffer fluid identifies the molecules which were bound to the ligands and ultimately identifies the molecules in the sample fluid which have said predefined characteristic.

Disadvantageously, as the buffer fluid flows along the conduit from the flow cell to the mass spectrometer, buffer fluid containing the collected molecules is contaminated by foreign molecules which are present in the conduit. The foreign molecules present in the conduit will be collected into the buffer fluid as the buffer fluid flows along the conduit from the flow cell to a mass spectrometer; analysis at the mass spectrometer will indicate that the buffer fluid contains the foreign molecules, thus falsely indicating that the foreign molecules were bound to ligands and have said predefined characteristic.

In one example the conduit between the flow cell and mass spectrometer may contain remnant sample fluid; as the buffer fluid flows along the conduit from the flow cell to a mass spectrometer the remnant sample fluid present in the conduit will be collected into the buffer fluid; as a result the buffer fluid will now contain all of the different types of molecules present in the sample fluid and not just those molecules which were bound to the ligands. As a result it will not be possible to accurately identify at the mass spectrometer if the original sample fluid contained molecules which have said predefined characteristic.

It is an aim of the present invention to at least mitigate some of the above-mentioned disadvantages.

BRIEF SUMMARY OF THE INVENTION

According to the invention there is provided an assembly which can be used for recovering molecules in a sample, the assembly comprising, a first flow cell which comprises first ligands which can bind to molecules; at least one waste reservoir which is connected to a first fluid port of the first flow cell via a first conduit and a second conduit which connects the waste reservoir to a second fluid port of the first flow cell; and a first valve arranged to control the fluid communication between the first conduit and the waste reservoir, and a means to control the fluid communication between the second conduit and the waste reservoir, at least one buffer reservoir which can hold buffer fluid, which is fluidly connected to the first conduit via a first subsidiary conduit, wherein the first subsidiary conduit connects to the first conduit at a first junction which is located between the a first fluid port of the first flow cell and the first valve, and wherein buffer fluid can be selectively supplied from the buffer reservoir into the first subsidiary conduit; a unit which comprises at least a collection reservoir, and a sample reservoir which can hold sample fluid, wherein said unit is fluidly connected to the second conduit via a second subsidiary conduit, wherein the second subsidiary conduit connects to the second conduit at a second junction which is located between the second fluid port of the first flow cell and the second valve, and wherein the unit is operable to selectively fluidly connect the collection reservoir, buffer reservoir, or sample reservoir, with the second subsidiary conduit.

The means to control the fluid communication between the second conduit and the waste reservoir may comprise a second valve and/or a flow restrictor.

An assembly may further comprise a second flow cell.

An assembly may further comprise, a further selection valve between a first port of the second flow cell and a first waste reservoir, a further selection valve between the first buffer reservoir and said first junction; and a seventh selection valve between a junction and a further junction), wherein said junction is between the first buffer reservoir and said selection valve which is between the first buffer reservoir and the first junction and said further junction is between said first port of the second flow cell and said selection valve between a first port of the second flow cell and a first waste reservoir.

The assembly may further comprise a further selection valve between a second port of the second flow cell and a second waste reservoir.

The assembly may further comprise a third flow cell and a fourth flow cell.

In one embodiment the flow cell is provided in a cartridge, and wherein the cartridge comprises a connecting means which can be selectively arranged to cooperate with a connecting means provided on a fixed part of the assembly, so that the cartridge to be selectively connected or disconnected from the fixed part of the assembly.

The assembly may comprise a first waste reservoir and second waste reservoir, wherein the first waste reservoir can be fluidly connected to a first fluid port of the first flow cell via the first conduit, and the second waste reservoir can be fluidly to a second fluid port of the first flow cell via the second conduit.

In an embodiment the first flow cell comprises a plurality of first ligands which occupy an area greater than 1 mm$^2$.

The assembly may comprise a first buffer reservoir which can be fluidly connected to the first conduit via the first subsidiary conduit, and a second buffer reservoir which can be fluidly connect to the second conduit via the second subsidiary conduit.

The first buffer reservoir may comprise a first syringe pump.

The second buffer reservoir may comprise a second syringe pump.

The unit may comprise, a third valve which is fluidly connected to the second subsidiary conduit; and a storage conduit which fluidly connects the syringe pump to the third valve; and wherein the third valve may be operable to selectively, fluidly connect the storage conduit to the second subsidiary conduit, or fluidly connect the collection reservoir to the second subsidiary conduit, or fluidly connect the sample reservoir to the second subsidiary conduit.

The unit may further comprise an X-Y table on which the collection reservoir and sample reservoir are supported; and wherein the X-Y table is moveable to selectively fluidly connect the collection reservoir to the third valve, or fluidly connect the sample reservoir to the third valve.

The unit may further comprise a third waste reservoir, and, an elution reagent reservoir which can hold regeneration fluid.

The third waste reservoir and/or the elution reagent reservoir may be supported on the X-Y table. The X-Y table may be moveable to selectively fluidly connect the collection reservoir to the third valve, or fluidly connect the sample reservoir to the third valve, or fluidly connect the third waste reservoir to the third valve, or fluidly connect the elution reagent reservoir to the third valve.

The unit may comprise an autosampler.

The second junction may be located closer to the second fluid port of the first flow cell than to the second valve.

The first junction may be located closer to the first fluid port of the first flow cell than to the first valve.

The first flow cell may comprise a plurality of ligands which occupy an area greater than 1 mm$^2$.

According to a further aspect of the present invention there is provided a method of molecule recovery using an assembly which comprises a first flow cell which comprises ligands which can bind to molecules, and a conduit which can selectively fluidly connect the first flow cell to a collection reservoir; the method comprising the steps of
  (a) flowing a sample fluid along the conduit into the first flow cell;
  (b) flowing a buffer fluid through at least a portion of the conduit, without flowing any of the buffer fluid through the first flow cell so that sample fluid is maintained in the first flow cell but said at least a portion of the conduit is cleaned by the buffer fluid;
  (c) flowing a buffer fluid through the first flow cell to flush the sample fluid out of the first flow cell;
  (d) flowing a fluid through the first flow cell, along the conduit, and into the collection reservoir, so that molecules of the sample fluid which were bound to ligands and which have become dissociated from the ligand are collected into the fluid which flows through the first flow cell and are brought to the collection reservoir.

The step (d) of flowing a fluid through the first flow cell, along the conduit, and into the collection reservoir, so that molecules of the sample fluid which were bound to ligands and which have become dissociated from the ligands are collected into the fluid which flows through the first flow cell and are brought to the collection reservoir, may comprise, flowing a buffer fluid through the first flow cell, along the conduit, and into the collection reservoir, so that molecules of the sample fluid which were bound to ligands and which have dissociated from the ligands, are collected into the buffer fluid which flows through the first flow cell and are brought to the collection reservoir.

The step (c) of flowing a buffer fluid through the first flow cell to flush the sample fluid out of the first flow cell, may comprise flowing a buffer fluid through the first flow cell for a period between 10 milliseconds-10 seconds.

The step (d) of flowing a fluid through the first flow cell, along the conduit, and into the collection reservoir, so that molecules of the sample fluid which were bound to ligands and which have become dissociated from the ligands are collected into the fluid which flows through the first flow cell and are brought to the collection reservoir, may comprise, flowing a regeneration fluid into the first flow cell, along the conduit, and into the collection reservoir, wherein the regeneration fluid causes molecules which were bound to ligands to dissociate from the ligands to which they are bound, and the dissociated molecules are collected into the regeneration fluid which flows through the first flow cell and are brought to the collection reservoir.

The step (b) of flowing a buffer fluid through at least a portion of the conduit, may comprise flowing a volume of buffer fluid along said at least a portion of the conduit which is equal to between 3-5 times the volume of said at least a portion of the conduit.

The method may further comprise the step of replacing the first flow cell which comprises ligands with a first flow cell which comprises a different type of ligands, and repeating steps (a)-(d).

The method may comprise using any of the above-mentioned assemblies to perform at least steps (a)-(d).

A method may comprise, using any of the above-mentioned assemblies, the steps of,
  (a) flowing sample fluid along the second subsidiary conduit, through the first flow cell, along the first conduit and into the waste reservoir;
  (b) flowing a buffer fluid out of the second buffer reservoir, along the second subsidiary conduit, and into the waste reservoir;
  (c) flowing a buffer fluid out of the first sample reservoir, along the first subsidiary conduit, and into the waste reservoir;
  (d) flowing a buffer fluid out of the first buffer reservoir, along the first subsidiary conduit, through the first flow cell, along the second conduit and into the waste reservoir, so as to flush the sample fluid out of the first flow cell;
  (e) collecting into buffer fluid which flows in the first flow cell molecules which have passively dissociated from ligands in the first flow cell;
  (f) collecting, via the second subsidiary conduit, the buffer fluid which contains said molecules into the collection reservoir.

The method may further comprise the step of flowing a buffer fluid out of the first sample reservoir, along the first subsidiary conduit, through the first flow cell, and along the second conduit, and into the waste reservoir.

The method may further comprise the step of flowing sample fluid along the second subsidiary conduit, and into the waste reservoir.

The said step (d) of flowing a buffer fluid out of the first buffer reservoir, along the first subsidiary conduit, through the first flow cell, along the second conduit and into the waste reservoir, so as to flush the sample fluid out of the first flow cell, may comprise,
  flowing said buffer fluid through the first flow cell for a period between 10 milliseconds-10 seconds.

A method may comprise, using any of the above-mentioned assemblies, the steps of,
(a) flowing sample fluid along the second subsidiary conduit, through the first flow cell, along the first conduit and into the waste reservoir;
(b) flowing a buffer fluid out of the first sample reservoir, along the first subsidiary conduit, through the first flow cell, and along the second conduit, and into the waste reservoir;
(c) flowing a buffer fluid out of the second first sample reservoir, along the second subsidiary conduit, and into the waste reservoir;
(d) flowing a regeneration fluid along the second subsidiary conduit and into the first flow cell, wherein the regeneration fluid causes molecule which are bound to ligands in the first flow cell to dissociate from the ligands;
(e) collecting in the regeneration fluid, molecules which have dissociated from the ligands;
(f) flowing a buffer fluid out of the second first sample reservoir, along the second subsidiary conduit, and into the waste reservoir;
(g) collecting, via the second subsidiary conduit, the regeneration fluid which contains said molecules into the collection reservoir.

The method may further comprise the step of flowing a buffer fluid out of the first sample reservoir, along the first subsidiary conduit, and into the waste reservoir.

The step (d) may comprises flowing a regeneration fluid along the second subsidiary conduit, through the first flow cell, and along at least a part of the first subsidiary conduit.

A method may further comprise the steps of, passing the fluid which is collected in the collection reservoir to an analytical device; and identifying using the analytical device the molecules in the fluid which were bound to ligands in the first flow cell.

The analytical device may comprise a mass spectrometer.

A method may further comprise the steps of, monitoring to detect is molecules have bound to ligands in the first flow cell.

A method may further comprise the steps of, monitoring to detect is molecules have bound to ligands in the first flow cell, and
passing the fluid which is collected in the collection reservoir to an analytical device which can be used to identify the molecules in the fluid which were bound to ligands in the first flow cell, only if the monitoring detects that molecules were bound to ligands in the first flow cell.

A method may further comprise the steps of, preparing the sample fluid by, pooling a plurality of different fluids in a sample reservoir or receptacle.

According to a further aspect of the present invention there is provided a cartridge comprising one or more flow cells and connecting means which can be selectively arranged to cooperate with connecting means provided on a fixed part of a microfluid assembly, so that the cartridge can be selectively connected or disconnected from the fixed part, wherein the cartridge comprises at least a first flow cell with first ligands which can bind to molecules, the first flow cell having a first fluid port and a second fluid port, and wherein the fixed part comprises at least, one waste reservoir which is connectable to the first fluid port of the first flow cell via a first conduit and a second conduit which can connect the waste reservoir to the second fluid port of the first flow cell and a first valve arranged to control the fluid communication between the first conduit and the waste reservoir, and a second valve to control the fluid communication between the second conduit and the waste reservoir; at least one buffer reservoir which can hold buffer fluid, which is fluidly connected to the first conduit via a first subsidiary conduit, wherein the first subsidiary conduit connects to the first conduit at a first junction which is located between the a first fluid port of the first flow cell and the first valve, and wherein buffer fluid can be selectively supplied from the buffer reservoir into the first subsidiary conduit; and a unit which comprises at least a collection reservoir, and a sample reservoir which can hold sample fluid, wherein said unit is fluidly connected to the second conduit via a second subsidiary conduit, wherein the second subsidiary conduit connects to the second conduit at a second junction which is located between the second fluid port of the first flow cell and the second valve, and wherein the unit is operable to selectively fluidly connect the collection reservoir, buffer reservoir, or sample reservoir, with the second subsidiary conduit, so that a microfluid assembly according to any one of the above mentioned microfluid assemblies is formed when the cartridge is connected to the fixed part.

BRIEF DESCRIPTION OF THE DRAWINGS

The invention will be better understood with the aid of a description of embodiments, which are given by way of example only, and illustrated by the figures, in which:

FIG. 7 provides the bottom view of portion of disposable cartridge shown in FIG. 6a.

DETAILED DESCRIPTION OF POSSIBLE EMBODIMENTS OF THE INVENTION

Figure 1:
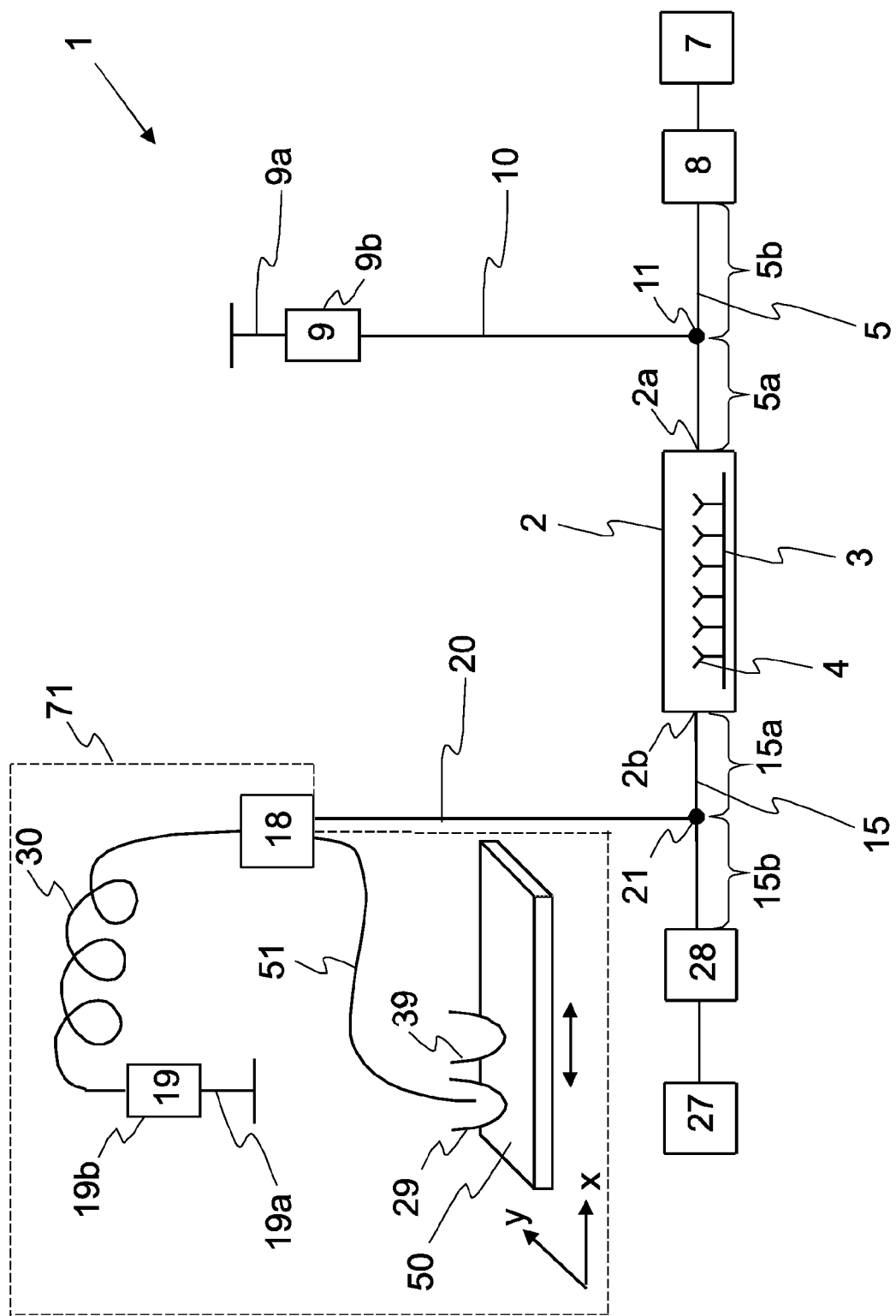
FIG. 1 provides a schematic view of a microfluidic assembly according to a preferred embodiment of the present invention.

FIG. 1 provides a schematic view of a microfluidic assembly 1 according to one embodiment of the present invention, which is suitable for biochemical sensing, for instance screening for unknown molecules having a high affinity towards the ligands, or detection or quantification of known molecules at unknown concentrations in a sample fluids binding to the ligands. Examples include small molecule drugs and their drug target, such as Acetylsalicylic acid (also known as Aspirin) binding to cyclooxygenase; or recombinant antibodies affinity-selected from phage-display libraries which can be used to detect cancer biomarkers, such as Human Epidermal growth factor Receptor 2, in body fluids.

The microfluidic assembly 1 comprises a first flow cell 2 which comprises a first surface 3 which comprises first ligands 4. The first ligands 4 are preferably immobilized using amine coupling within a thin hydrogel layer such as a Dextran layer covalently bound to the first surface 3; in another preferred embodiment the first ligands 4 are captured by a suitable tag such as hexahistidine or glutathione-S-transferase within a gel matrix such as Agarose within the first flow cell volume. Preferably, the first surface 3 has an area of greater than 1 square millimetres, or greater than 2 square millimetres, or greater than 5 square millimetres, in order to increase the total amount of ligands for a given (predefined) ligand surface density (e.g. the density of the ligands on the first surface 3 is a predefined density; thus increasing the area of the first surface 3 and maintaining the density equal to the predefined density will increase the number of ligands in the first flow cell), which may be limited as an example by a hydrogel layer thickness and/or ligand size. The area may be the area of the flat surface, or including the inner surface of micropores present at the surface. In the preferred embodiment the microfluidic assembly 1 furthermore comprises a sensor (such as a Surface Plasmon Resonance sensor, or, Waveguide interferometry sensor, or, surface acoustic sensor) which is configured to measure if molecules have become bound to the first ligands 4 within the first flow cell 2, and is preferably configured to measure the number of molecules which are bound to the first ligands 4 within the first flow cell 2; said sensor is preferably operable connected to the first flow cell 2 so that it can perform such measurements. The first ligands 4 can bind to molecules which have a predefined characteristic such as having a high affinity to the ligands either via a simple lock-and-key mechanism where a molecule fits into a binding pocket of a ligand, or assisted by more complex molecular processes such as conformational changes. Thus it can be determined which molecules in a sample fluid have said predefined characteristic of having a high affinity to the ligands, by passing the sample fluid over the first surface 3 of the first flow cell 2 and then determining which molecules have become bound to the first ligands 4.

A molecule which is bound to a ligand 4 remains bound until such time as it dissociates. A molecule can dissociate automatically without intervention from the ligand to which it is bound i.e. passive dissociation; in other cases intervention is required to cause the molecule to dissociate from the ligand to which it is bound i.e. active dissociation. For example for an active dissociation a regeneration solution such as Glycine at low pH can be flowed over the first surface 3 which cause the bound molecules to dissociate from the ligand 4.

The microfluidic assembly 1 further comprises a first conduit 5, one end of which is fluidly connected to a first fluidic port 2a of the first flow cell 2 and the other end of which is fluidly connected to a first selection valve 8. The first selection valve 8 can selectively fluidly connect the first conduit 5 to a first waste reservoir 7. The first waste reservoir 7 can receive and store unwanted fluid such as cleaning effluent.

The first selection valve 8 is moveable between a first position and second position; when the first selection valve 8 is in its first position, the first selection valve 8 allows fluid to pass from first conduit 5 into the first waste reservoir 7; and when the first selection valve 8 is in its second position first selection valve 8 is closed thus preventing the flow of fluid out of the first conduit 5 via the first selection valve 8.

The microfluidic assembly 1 further comprises a first buffer reservoir 9 which contains a buffer fluid which can be used for cleaning parts of the microfluidic assembly 1. In this example first buffer reservoir 9 comprises a first syringe pump 9; the first syringe pump 9 comprises a receptacle 9b which contains buffer fluid, and a plunger 9a which can be selectively plunged into the receptacle 9b to release buffer fluid out of the first syringe pump 9. Additionally moving the plunger in a direction out of receptacle 9b creates a negative pressure to aspirate buffer fluid into the first syringe pump 9. Preferably, the buffer fluid comprises a physiological buffer such as phosphate buffered saline solution (PBS).

The first buffer reservoir 9 is fluidly connected to the first conduit 5 by means of a first subsidiary conduit 10. The first subsidiary conduit 10 connects with the first conduit 5 at a first junction 11. As illustrated in FIG. 1, in this example the first subsidiary conduit 10 is arranged perpendicular to the first conduit 5 such that the first junction 11 is a T-shaped junction 11; however it will be understood that the first junction 11 may take any shape or configuration. Furthermore the first junction 11 is a valveless junction (i.e. there are no valves present at the first junction 11). In a variation of this embodiment a valve is provided at the first junction 11; and the valve is moveable between a first open position and second closed position; in the first open position the valve is open to allow fluid flow between the first subsidiary conduit 10 and the first conduit 5, and a second closed position the valve is closed block fluid flow between the first subsidiary conduit 10 and the first conduit 5.

The portion of the first conduit 5 which is located between the first fluidic port 2a of the first flow cell 2 and the first junction 11 will be referred to as the first portion 5a of the first conduit 5, and the portion of the first conduit 5 which is located between the first junction 11 and the first selection valve 8 will be referred to as the second portion 5b of the first conduit 5. In the preferred embodiment the first portion 5a of the first conduit 5 is configured to have a lower volume than the volume of second portion 5b of the first conduit; for example both the first portion 5a of the first conduit 5 and second portion 5b of the first conduit 5 have equal internal diameters, and the first portion 5a of the first conduit 5 is configured to be shorter than the length of the second portion 5b of the first conduit 5 so that the first portion 5a of the first conduit 5 has a lower volume than the volume of the second portion 5b of the first conduit 5; in another example both the first portion 5a of the first conduit 5 and second portion 5b of the first conduit 5 have equal lengths, and the first portion 5a of the first conduit 5 is configured to have a shorter internal diameter than the internal diameter of the second portion 5b of the first conduit 5 so that the first portion 5a of the first conduit 5 has a lower volume than the volume of the second portion 5b of the first conduit 5. Preferably the first portion 5a of the first conduit 5 has a volume of between 1 nanoliters and 10 microliters, and the second portion 5b of the first conduit 5 has at least twice the volume of the first portion 5a of the first conduit 5; most preferably the first portion 5a of the first conduit 5 has a volume between 1 nanoliters and 1 microliters and the second portion 5b of the first conduit 5 has at least three times the volume of the first portion 5a of the first conduit 5.

The microfluidic assembly 1 further comprises a second conduit 15 one end of which is fluidly connected to a second fluidic port 2b of the first flow cell 2 and the other end of which is fluidly connected to a second selection valve 28; the second selection valve 28 can selectively fluidly connect the second conduit 5 to a second waste reservoir 27. The second waste reservoir 27 can receive and store unwanted fluid such as cleaning effluent.

In a variation of this embodiment the assembly 1 comprises a single waste reservoir only. For example, in a variation of this embodiment the assembly 1 does not comprise a second waste reservoir 27; instead the second selection valve 28 is fluidly connected to the first waste reservoir, so that the second selection valve can selectively fluidly connect the second conduit 15 to the first waste reservoir 7. Advantageously in this variation of the embodiment the microfluidic assembly 1 comprises a lower number of waste reservoirs.

Continuing with respect to the embodiment illustrated in FIG. 1, the second selection valve 28 is moveable between a first position and second position; when the second selection valve 28 is in its first position, the second selection valve 28 allows fluid to pass from the second conduit 15 into the second waste reservoir 27; and when the second selection valve 28 is in its second position the second selection valve 28 is closed thus preventing the flow of fluid out of the second conduit 15 into the second waste reservoir 27.

The microfluidic assembly 1 further comprises a second buffer reservoir 19 which contains a buffer fluid which can be used for cleaning parts of the microfluidic assembly 1. In this example second buffer reservoir 19 comprises a second syringe pump 19; the second syringe pump 19 comprises a receptacle 19b which contains buffer fluid, and a plunger 19a which can be selectively plunged into the receptacle 19b to selectively release buffer fluid out of the second syringe pump 19. Additionally moving the plunger 19a in a direction out of receptacle 19b creates a negative pressure to aspirate buffer fluid into the second syringe pump 19. Preferably, the buffer fluid comprises a physiological buffer such as phosphate buffered saline solution (PBS).

The microfluidic assembly 1 further comprises a sample reservoir 29 which contains a sample fluid containing molecules which are to be tested for binding to the first ligands 4, and a collection reservoir 39 into which bound molecules can be dispensed. In this exemplary embodiment the sample reservoir 29 and collection reservoir 39 are located on an x-y table 50. The x-y table can be selectively moved (along the x or y axis—as illustrated by the double-headed arrows) so as to selectively bring either the sample reservoir 29, or, collection reservoir 39 into fluid connection with an intermediate conduit 51. FIG. 1 shows the x-y table in a position where the sample reservoir 29 is fluidly connected to intermediate conduit 51 whereby the x-y table 50 is positioned so that the sample reservoir 29 positioned under the free end of the intermediate conduit 51; however it will be understood that the x-table 51 could be selectively operated to move (to the left i.e. along the x-axis) so that the collection reservoir 39 is positioned under the free end of the intermediate conduit 51 thus fluidly connecting the collection reservoir 39 to the intermediate conduit 51.

The microfluidic assembly 1 further comprises a third selection valve 18. The third selection valve 18 is fluidly connected to the intermediate conduit 51, thus the sample reservoir 29 and collection reservoir 39 can be selectively fluidly connected to the third selection valve 18. The third selection valve is further fluidly connected with the second syringe pump 19, via a storage conduit 30. In this example the storage conduit 30 is a coiled conduit so as to increase the volume of fluid which can be stored in the storage conduit 30. In this example the storage conduit 30 has an internal volume greater than 100 microliters. One end of the storage conduit 30 is fluidly connected to the second syringe pump 19 and the opposite end of the storage conduit 30 is fluidly connected to the third selection valve 18.

The storage conduit 30, x-y table 50, third selection valve 18, second buffer reservoir 19 (e.g. the second syringe pump 19), intermediate conduit 1, the sample reservoir 29 and collection reservoir 39, can be considered to collectively define a unit 71.

In a variation of the embodiment, instead of the unit 71 (i.e. instead of the group of components including the storage conduit 30, x-y table 50, second buffer reservoir 19, third selection valve 18, intermediate conduit 1, the sample reservoir 29 and collection reservoir 39) any other suitable means for loading and storing sample fluid may be provided, such as an autosampler for example; for example autosampler model such as "Alias" made by Spark Holland, NL. could be provided in the assembly 1 instead of said above-mentioned group of components. Preferably in this variation of the embodiment the assembly will further comprise a pump which is operably connected to the autosampler.

Continuing with respect to the assembly illustrated in FIG. 1, the third selection valve 18 is fluidly connected to the second conduit 15 by means of a second subsidiary conduit 20. The second subsidiary conduit 20 connects with the second conduit 15 at a second junction 21. As illustrated in FIG. 1, in this example the second subsidiary conduit 20 is arranged perpendicular to the second conduit 15 such that the second junction 21 is a T-shaped junction 21; however it will be understood that the second junction 21 may take any shape or configuration. In this embodiment the second junction 21 is valveless (i.e. there is no valve present at the second junction 21). In a variation of this embodiment a valve is provided at the second junction 21; and the valve is moveable between a first open position and second closed position; in the first open position the valve is open to allow fluid flow between the second subsidiary conduit 20 and the second conduit 15, and a second closed position the valve is closed block fluid flow between the second subsidiary conduit 20 and the second conduit 15.

The portion of the second conduit 15 which is located between the second fluidic port 2b of the first flow cell 2 and the second junction 21 will be referred to as the first portion 15a of the second conduit 15, and the portion of the second conduit 15 which is located between the second junction 21 and the second selection valve 28 will be referred to as the second portion 15b of the second conduit 15. In the preferred embodiment the first portion 15a of the second conduit 15 has a much lower volume than the second portion 15b of the second conduit 15. For example both the first portion 15a of the second conduit 15 and second portion 15b of the second conduit 15 may have equal internal diameters, and the first portion 15a of the second conduit 15 is configured to be shorter than the length of the second portion 15b of the second conduit 15 so that the first portion 15a of the second conduit 15 has a lower volume than the volume of the second portion 15b of the second conduit 15; in another example both the first portion 15a of the second conduit 15 and second portion 15b of the second conduit 15 have equal lengths, and the first portion 15a of the second conduit 15 is configured to have a shorter internal diameter than the internal diameter of the second portion 15b of the second conduit 15 so that the first portion 15a of the second conduit 15 has a lower volume than the volume of the second portion 15b of the second conduit 15. Preferably the first portion 15a of the second conduit 15 has a volume of between 10 nanoliters and 10 microliters, and the second portion 15b of the second conduit 15 has at least twice the volume of the first portion 15a of the second conduit 15; most preferably the first portion 5a of the second conduit 15 has a volume between 10 nanoliters and 1 microliters and the second portion 15b of the second conduit 15 has at least three times the volume of the first portion 15a of the second conduit 15.

The third selection valve 18 is moveable between a first position and a second position. When the third selection valve 18 is in its first position the third selection valve 18 fluidly connects the intermediate conduit 51 with the storage conduit 30. Thus if the third selection valve 18 is in its first position, and the x-y table is positioned so that the intermediate conduit 51 is fluidly connected to the sample reservoir 29, then sample fluid in the sample reservoir can pass through conduit 51, and into the storage conduit 30 via the third selection valve 18. Likewise, if the third selection valve 18 is in its first position, and the x-y table is positioned so that the intermediate conduit 51 is fluidly connected to the collection reservoir 39, then fluid in the storage conduit 30 can pass into the intermediate conduit 51 via the third selection valve 18, and from the intermediate conduit 51 into the collection reservoir 39.

When the third selection valve 18 is in its second position the third selection valve 18 fluidly connects the storage conduit 30 with the second subsidiary conduit 20; thus when the third selection valve 18 is in its second position fluid can flow from the storage conduit 30 into the second subsidiary conduit 20 via the third selection valve 18, or from the second subsidiary conduit 20 into the storage conduit 30 via the third selection valve 18.

In variation of the embodiment shown in FIG. 1, no second selection valve 28 is provided in the microfluidic assembly 1, and instead the second portion 15b of the second conduit 15 comprises a flow restrictor. The flow restrictor may be defined by a part of the second portion 15b of the second conduit 15 having a smaller inner diameter than the inner diameter of the rest of the second conduit 15, for example a part of the second portion 15b of the second conduit 15 may have an inner diameter between 10 micrometers and 200 micrometers and the rest of the second conduit 15 may have an inner diameter between 200 micrometers and 1 millimeter; and/or the flow restrictor may be defined by the second portion 15b of the second conduit 15 having a length which is substantially longer than the first portion 15a of the second conduit 15, for example the second portion 15b of the second conduit 15 may have a length between 100 millimeters and 10 meters and the first portion 15a of the second conduit 15 may have a length between 10 micrometers and 10 millimeters. The microfluidic assembly 1 can be used to test sample fluid provided in the sample reservoir 29 for molecules with high affinity towards first ligands 4 provided in the first flow cell 5.

The microfluidic assembly 1 can be used to implement an exemplary method according to a method embodiment of the present invention. During use of the microfluidic assembly 1, sample fluid which is to be tested, is provided in the sample reservoir 29.

Optionally, the first selection valve 8 is then moved to its second position so that first selection valve 8 is closed and the second selection valve 28 is moved to its first position so that second selection valve 28 is open. Optionally, the plunger 9a is plunged into the receptacle 9a so that buffer fluid is released from the first syringe pump 9. The buffer fluid flows out of the first syringe pump 9, through the first subsidiary conduit 10, into the first portion 5a of the first conduit 5, and into the first flow cell 2 and into the second conduit 15, and into the second waste reservoir 27.

The x-y table 50 is then moved so that the sample reservoir 29 is fluidly connected with the intermediate conduit 51.

The third selection valve 18 is then moved to its first position so that the intermediate conduit 51 is fluidly connected with the storage conduit 30 via the third selection valve. With the third selection valve 18 in its first position, the plunger 19a of the second syringe pump 19 is moved in a direction out of receptacle 19b so as to create a negative pressure in the storage conduit 30. As a result sample fluid is aspirated from the sample reservoir 29, into the intermediate conduit 51, and into the storage conduit 30 via the third selection valve 18.

Preferably the volume of sample fluid which is aspirated from the sample reservoir 29, into the intermediate conduit 51, and into the storage conduit 30 via the third selection valve 18 is between three times the internal volume of the second subsidiary conduit 20 and the internal volume of the storage conduit 30; most preferably it is between five times the internal volume of the second subsidiary conduit 20 and the internal volume of the storage conduit 30.

Optionally, next the third selection valve 18 is moved to its second position so that the third selection valve 18 fluidly connects the storage conduit 30 and the second subsidiary conduit 20. Optionally the plunger 19a is then plunged into the receptacle 19b of the second syringe pump 19 so as to force buffer fluid out of the second syringe pump 19. The buffer fluid which is released from the second syringe pump 19 pushes some of the sample fluid out of the storage conduit 30 and into the second subsidiary conduit 20. Since the first selection pump 8 is closed, pressure provided by buffer fluid which is present in the first portion 15a of the second conduit 15 will prevent the sample fluid from flowing along the first portion 15a of the second conduit 15 towards the first flow cell 2; furthermore since the second selection valve 28 is in its first position so that second selection valve 28 is open, the sample fluid will flow from the second subsidiary conduit and into the second portion 15b of the second conduit 15 and into the second waste reservoir 27 via the second selection valve 28.

Preferably pressure provided by the buffer fluid present in the first portion 15a of the second conduit 15 prevents the sample fluid from flowing along the first portion 15a of the second conduit 15 into the first flow cell 2. In some cases a negligible amount of sample fluid may move by diffusion along a portion of the first portion 15a of the second conduit 15. In one embodiment, in order to prevent or at least minimize the diffusion of sample fluid along a portion of the first portion 15a of the second conduit 15, preferably the flow of buffer fluid from the first buffer reservoir 9 through the first flow cell 2 and into the second waste reservoir 27 is maintained as the sample fluid is flowing from the storage conduit 30, along the second subsidiary conduit 20 and into the second waste reservoir 27.

Preferably, the volume of sample fluid which is allowed to flow from the storage conduit 30, along the second subsidiary conduit 20 and into the second waste reservoir 27, is more than twice the volume of the second subsidiary conduit 20, but less than the volume of sample fluid which has been previously aspirated from the sample reservoir 29, into the intermediate conduit 51, and into the storage conduit 30 via the third selection valve 18. Thus there is some sample fluid remaining in the storage conduit 30.

Thus at this stage preferably the second subsidiary conduit 20 is effectively rinsed by the sample fluid. Thus at this stage preferably the first subsidiary conduit 10, the first portion 5a of the first conduit 5, the first flow cell 2, and the first portion 15a of the second conduit 15 all contain buffer fluid only; while preferably the second subsidiary conduit 20 contains sample fluid only, and the second portion 15b of the second conduit 15 at least contains some sample fluid. It highlighted that the steps described in paragraphs 67-70 are optional and, although are preferable said steps are not essential to the present invention.

Next the first selection valve 8 is moved to its second position (i.e. the first selection valve 8 is opened) so that fluid can pass from first conduit 5 into the first waste reservoir 7 and preferably the second selection valve 28 is moved to its second position so that it is closed. With the third selection valve 18 still in its second position, the plunger 19a is plunged into the receptacle 19b of the second syringe pump 19 so as to force more buffer fluid out of the second syringe pump 19. The buffer fluid which is released from the second syringe pump 19 pushes a portion of, or all of, the sample fluid remaining in the storage conduit, out of the storage conduit 30 and into the second subsidiary conduit 20. Since the first selection valve 8 is in its second position (i.e. the first selection valve 8 is open) the buffer fluid present in the first portion 15a of the second conduit 15 no longer provides a pressure which prevents the sample fluid from flowing along the first portion 15a of the second conduit 15 into the first flow cell 2. Accordingly the sample fluid which is now passing into the second subsidiary conduit 20 flows into the first portion 15a of the second conduit 15, into the first flow cell 2, and along the first conduit 5, and into the first waste reservoir 7 via the first selection valve 8. As it flows, the sample fluid also flushes out any buffer fluid present in the first portion 15a of the second conduit 15, the first flow cell 2, and the first portion 5a of the first conduit 5, into the first waste reservoir 7.

Thus, at this stage the second subsidiary conduit 20, the first portion 15a of the second conduit 15, the first flow cell 2, and the first conduit 5 all contain sample fluid only. Advantageously, since prior to moving the first selection valve 8 to its second position there is sample fluid already present in the second subsidiary conduit 20, this allows the concentration of sample fluid within the first flow cell 2 to increase quickly when the first selection valve 8 is moved to its second position. When the sample fluid passes over the first surface 3 of the first flow cell 2, molecules which have a predefined characteristic necessary to allow them to bind with the first ligands 4 on the surface, will bind with the first ligands 4.

Next the first selection valve 8 is moved to its second position so that first selection valve 8 is closed and the second selection valve 28 is moved to its first position so that the second selection valve is opened. With the third selection valve 18 still in its second position so that the third selection valve 18 fluidly connects the storage conduit 30 and the second subsidiary conduit 20, the plunger 19a is plunged into the receptacle 19b of the second syringe pump 19 so as to force more buffer fluid out of the second syringe pump 19. The buffer fluid which is released from the second syringe pump 19 pushes the buffer fluid in the storage conduit 30, and any sample solution which is remaining in the storage conduit 30, out of the storage conduit 30 and into the second subsidiary conduit 20. The buffer fluid, and sample fluid, flows from the storage conduit 30, into the second subsidiary conduit 20, the second portion 15b of the second conduit 15 and subsequently into the second waste reservoir 27. Thus during this step the buffer fluid which is released from the second syringe pump 19 flushes out any sample fluid which is present in the storage conduit 30, the second subsidiary conduit 20, and/or the second portion 15b of the second conduit 15, into the second waste reservoir 27. Since the first selection valve 8 is closed, the sample fluid present in the first portion 15a of the second conduit 15 will apply a pressure to the buffer fluid which prevents the buffer fluid from flowing along the first portion 15a of the second conduit 15 towards the first flow cell 2.

Thus at this stage the second subsidiary conduit 20 and the second portion 15b of the second conduit 15, and the storage conduit 30, all contain buffer fluid only; and the first portion 15a of the second conduit 15, the first flow cell 2, and the first conduit 5, all contain sample fluid only. Importantly at this stage, the second subsidiary conduit 20 and the second portion 15b of the second conduit 15 have been cleaned by the buffer fluid; and sample fluid is present within the first flow cell 2 so if bound molecules passively dissociate from their respective first ligands 4, there will be other similar molecules available within the first flow cell 2 to bind to the available first ligands 4.

Next the first selection valve 8 is moved to its first position so that the first selection valve 8 allows fluid to pass from first conduit 5 into the first waste reservoir 7, and the second selection valve 28 is moved to its second position so that the second selection valve 28 is closed. Preferably the third selection valve 18 is still in its second position and the position of the plunger 19a is fixed so as to prevent the flow of fluid into or out of the receptacle 19b of the second syringe pump 19.

The plunger 9a of the first syringe pump 9 is then plunged into the receptacle 9b so that buffer fluid is released from the first syringe pump 9. The buffer fluid released from the first syringe pump 9 flows through the first subsidiary conduit 10, into the second portion 5b of the first conduit 5, and into the first waste reservoir 7 via the first selection valve 8. The sample fluid present in the first portion 5a of first conduit 5 will provide a pressure which will prevent the buffer fluid from flowing into the first portion 5a of first conduit 5 towards the first flow cell 2.

Thus at this stage the first portion 15a of the second conduit 15, the first flow cell 2, and the first portion 5a of first conduit 5, each contain sample fluid only; while the storage conduit 30, the first subsidiary conduit 10 and the second portion 5b of the first conduit 5, and the second subsidiary conduit 20 and the second portion 15b of the second conduit 15 each contain buffer fluid only. Importantly at this stage, the second subsidiary conduit 20, the second portion 15b of the second conduit 15, the first subsidiary conduit 10 and the second portion 5b of the first conduit 5 have all been cleaned with buffer fluid; and sample fluid is still present within the first flow cell 2 so if bound molecules passively dissociate from their respective first ligands 4, there will be other similar molecules available within the first flow cell 2 to bind to the available first ligands 4.

Next the first selection valve 8 is moved to its second position so that first selection valve 8 is closed and the second selection valve 28 is moved to its first position so that the second selection valve can allow fluid to flow from the second conduit 15 into the second waste reservoir 27. Preferably the third selection valve 18 is still in its second position and the position of the plunger 19a is fixed so as to prevent the flow of fluid into or out of the receptacle 19b of the second syringe pump 19. The plunger 9a of the first syringe pump 9 is then plunged into the receptacle 9b so that buffer fluid is released from the first syringe pump 9. The buffer fluid released from the first syringe pump 9 will flow through first portion 5a of first conduit 5, the first flow cell 2, the first and second portions 15a, 15b of the second conduit 15 and into the second waste reservoir 27, to clean these portions of the assembly. In this way the buffer fluid flushes out the sample fluid which was present in the first flow cell 2; molecules which are bound to the ligands will not be immediately flushed out of the first flow cell 2 by the buffer fluid due to their binding characteristic (i.e. the majority of molecules which are bound molecules to ligands remain in the first flow cell 2). Advantageously since the second portion 15b of the second conduit 15, the first subsidiary conduit 10, and the first portion 5a of the first conduit 5, all contain buffer fluid prior to closing the first and second selection valves 8, 18 the sample fluid present in the first flow cell 2 can be flushed out more quickly by the buffer fluid.

In the preferred embodiment, the buffer fluid is allowed to flow through the first flow cell for a period between 10 milliseconds and 10 seconds; preferably, the buffer fluid is allowed to flow through the first flow cell for a period between 0.1-2 seconds; most preferably the buffer fluid is allowed to flow through the first flow cell for a period of 0.5 seconds.

In this example, this is achieved by means of the plunger 19a of the second syringe pump 19. Specifically, with the third selection valve 18 still in its second position, the position of the plunger 19a is fixed (so as to prevent the flow of fluid into or out of the receptacle 19b of the second syringe pump 19) for a period of between 0.1-10 seconds so that the buffer fluid which is released from the first syringe pump 9 is forced to flow through the first flow cell 2 and into the second waste reservoir 27 for a period between 0.1-10 seconds; preferably with the third selection valve 18 still in its second position, the position of the plunger 19a is fixed (so as to prevent the flow of fluid into or out of the receptacle 19b of the second syringe pump 19) for a period of between 0.1-2 second so that the buffer fluid which is released from the first syringe pump 9 is forced to flow through the first flow cell 2 and into the second waste reservoir 27 for a period of between 0.1-2 seconds.

When the first ligands 4 are submersed in the sample fluid the first ligands 4 can easily bind with molecules present in the sample fluid; in other words if a molecule is passively dissociated from a ligand, 4 then there will be another molecule of the same type available in the first flow cell to bind to the available ligand 4. Over time molecules which are bound to first ligands 4 become dissociated from their respective first ligands 4; therefore in order to isolate the molecules which are bound to the first ligands 4 one should flush the sample fluid out of the first flow cell 5 quickly enough before the bound molecules start to passively dissociated from their respective first ligands 4 (or at least before the majority of the bound molecules become passively dissociated from their respective first ligands 4). Preventing the flow of the buffer fluid into the second subsidiary conduit 20, by having third selection valve 18 in its second position and fixing the position of the plunger 19a, for a period between 0.1-10 seconds, ensures that the buffer fluid flushes out the sample fluid present in the first flow cell 2 into the second waste reservoir 27, for less than 10 seconds; in this example it takes 10 seconds or longer for the majority of bound molecules become dissociated from their respective first ligands 4; accordingly even after the buffer fluid has flushed out the sample fluid from the first flow cell 2 to the second waste reservoir 27, the majority of bound molecules remain in the first flow cell 2 bound to their respective first ligands 4. Thus this step achieves isolation of the molecules which are bound to first ligands 4 from sample fluid present in the first flow cell 2.

In this particular example, with the third selection valve 18 still in its second position, the position of the plunger 19a is fixed (so as to prevent the flow of fluid into or out of the receptacle 19b of the second syringe pump 19) for a period of 0.5 seconds, so that the buffer fluid which is released from the first syringe pump 9 is forced to flow through the first flow cell 2 and into the second waste reservoir 27 for a period of 0.5 seconds.

0.5 seconds after the buffer fluid has first flowed through the first flow cell 2, the plunger 19a of the second syringe pump 19 is moved in a direction out of receptacle 19b so as to create a negative pressure in the storage conduit 30. Since the third selection valve 18 is still in its second position, negative pressure in the storage conduit 30 will cause the buffer fluid which exits the first flow cell 2, to be aspirated towards flowing along the second subsidiary conduit 20 and into the storage conduit 30 via the third selection valve 18. Also the buffer fluid which is subsequently released from the first syringe valve 9 will now flow through first subsidiary conduit 10, the first portion 5a of first conduit 5, the first flow cell 2, the first portion 15a of the second conduit 15, and along the second subsidiary conduit 20 and into the storage conduit 30 via the third selection valve 18. Over time the molecules which are bound to ligands within the first flow cell 2 will passively dissociate. As the buffer passes through the first flow cell 2 it will collect the molecules which have become passively dissociated from their respective first ligands 4. Accordingly after a period of time, preferably between 10 seconds and one hour, the storage conduit will contain buffer fluid having all of (or at least the majority of) molecules which were bound to the first ligands 4 in the first flow cell 5.

Next the x-y table 50 is moved so that the collection reservoir 39 is fluidly connected with the intermediate conduit 51.

The third selection valve 18 is then moved to its first position so that the intermediate conduit 51 is fluidly connected with the storage conduit 30 via the third selection valve.

With the third selection valve 18 in its first position, the plunger 19a of the second syringe pump 19 is plunged into the receptacle 19b so that buffer fluid is released from the second syringe pump 19 into the storage conduit 30. The buffer fluid which is released from the second syringe pump 19 pushes the buffer fluid having said molecules (i.e. the molecules which have become passively dissociated from their respective first ligands 4) out of the storage conduit 30 and into the collection reservoir 39. Thus at this stage the molecules which were bound the first ligands 4 (or at least the majority of the molecules which were bound the first ligands 4) have been isolated from the rest of sample solution.

The buffer fluid (having said molecules) can be taken from the collection reservoir 39, and provided to an analytical device which is configured to determine/identify the molecules which are present in the buffer fluid; and thus ultimately determine/identify the molecules which were bound to the first ligands 4 within the first flow cell 2; for example the analytical device may be a mass spectrometer, the mass spectrometer is used to identify which molecules are contained in the buffer fluid, thus identifying the molecules which were bound to the first ligands 4 in the first flow cell 2.

Advantageously since, prior to aspirating the buffer fluid into the storage conduit 30 (i.e. since prior to moving the plunger 19a of the second syringe pump 19 in a direction out of receptacle 19b so as to create a negative pressure in the storage conduit 30), the first subsidiary conduit 10, second subsidiary conduit 20, the second portion 5b of the first conduit 5, and the second portion 5b of the second conduit 15 have each already been cleaned with buffer fluid, the buffer fluid (which contains dissociated molecules) collected in the storage conduit 30 (and ultimately said buffer fluid (containing dissociated molecules) which ends up in the collection reservoir 39) will not be contaminated by sample fluid which would otherwise be present in the first subsidiary conduit 10, second subsidiary conduit 20, second portion 5b of the first conduit 5, and the second portion 5b of the second conduit 15. In particular the buffer fluid (which contains dissociated molecules) collected in the storage conduit 30 (and ultimately said buffer fluid (containing dissociated molecules) which ends up collected in the collection reservoir 39) will not be contaminated by sample fluid which would otherwise be present in the second subsidiary conduit 20. Preferably, the volume percentage of remaining sample fluid in the buffer fluid (which contains dissociated molecules) collected in the storage conduit 30 (and ultimately said buffer fluid (containing dissociated molecules) which ends up collected in the collection reservoir 39) is below 1% or below 0.5% or below 0.1%. Thus only molecules present in the sample fluid which have bound to the ligand will be present in the buffer fluid which is aspirated into the collection reservoir 39. The buffer fluid which is aspirated into the collection reservoir 39 is preferably passed to an analytical device where the molecules in the buffer fluid are identified. Advantageously, providing a large area of the first surface 3 and cleaning the flowpath such as the percentage of remaining sample volume in the buffer fluid (which contains dissociated molecules) is low results in a high ratio of dissociated molecules to sample fluid in the collection reservoir 39. As an example, if a mixture of several molecule types is injected at a concentration of 1 micrograms per milliliters each, resulting in a binding of one molecule type to the first surface 3 with a surface density of 0.1 nanograms per square millimeter, and the first surface 3 has an area of 5 square millimeters, and the sample is collected into a volume of 20 microliters, then the maximum concentration of recovered bound molecules will be 25 nanograms per milliliter. If the flowpath according to the present invention is cleaned such as the percentage of remaining original sample with all molecule types is 0.1%, then the concentration of the other molecule types will be 1 nanograms per milliliter. Thus, the ratio of recovered bound molecules to the non-bound molecule types is 25 fold.

In the above example the first flow cell 2 may be replaced with another first flow cell which comprises a different type of ligands (i.e. ligands which can bind to molecules which have a different predefined characteristic). For example negative control ligands having a specific mutation resulting in a deactivation of the binding site of interest and the above steps are repeated to test the sample fluid. The results of this text may be compared to the results of the previous test to determine non-specific binders; for example if molecules can be identified to bind to the ligands in the first test but also bind to the negative control ligands in the second test, these molecules can be considered to bind non-specifically.

Figure 2:
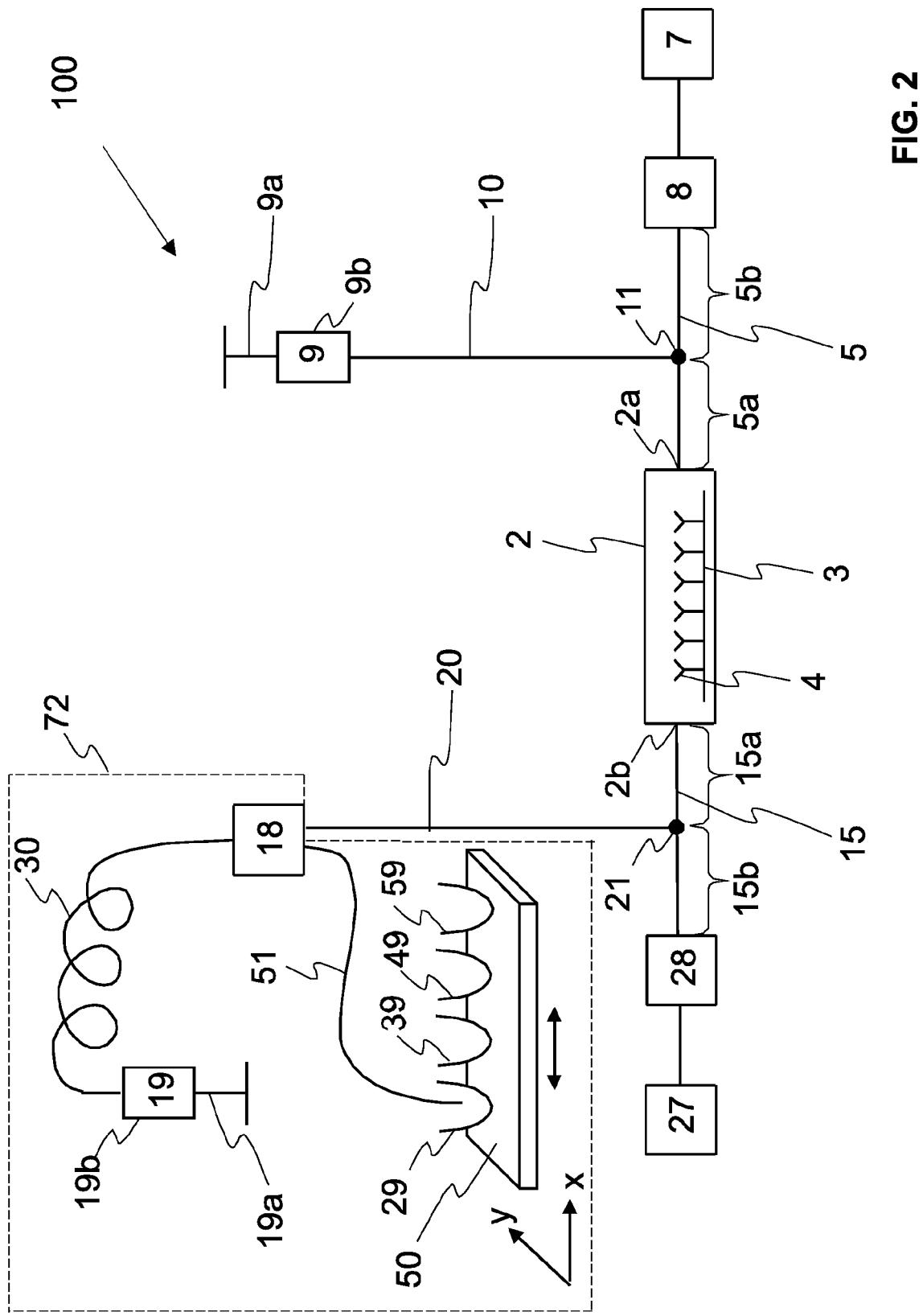
FIG. 2 provides a schematic view of a microfluidic assembly according to another embodiment of the present invention.

The above example describes using the microfluidic assembly 1 to test a sample fluid which contains molecules which passively dissociate from the first ligands 4 within the first flow cell 2. FIG. 2 illustrates a microfluidic assembly 100 according to a further embodiment of the present invention which can also be used to test a sample fluid which contains molecules which only actively dissociate from the ligands within the first flow cell i.e. to test a sample fluid which contains molecules which only dissociate from the ligands when a regeneration solution (such as Glycine at low pH) flows through the first flow cell 2 to force the bound molecules to become dissociated from their respective ligands.

The microfluidic assembly 100 comprises many of the same features as the microfluidic assembly 1 shown in FIG. 1 and like features are awarded the same reference numbers.

However the microfluidic assembly 100 additionally comprises a third waste reservoir 49, and an elution reagent reservoir 59, located on the x-y table 50. The third waste reservoir 49 can receive and store unwanted fluid such as cleaning effluent. The elution reagent reservoir 59 contains a regeneration fluid which, when flowed over the first ligands 4 of the first flow cell 2, can cause molecules which are bound to ligands to become disassociated from the first ligands 4.

The x-y table can be selectively moved (along the x or y axis—as illustrated by the double-headed arrows) so as to selectively bring either the sample reservoir 29, or, collection reservoir 39, or third waste reservoir 49, or elution reagent reservoir 59, into fluid connection with an intermediate conduit 51. FIG. 2 shows the x-y table in a position where the sample reservoir 29 is fluidly connected to intermediate conduit 51 whereby the x-y table 50 is positioned so that the sample reservoir 29 positioned under the free end of the intermediate conduit 51; however it will be understood that the x-table 51 could be selectively operated to move (to the left i.e. along the x-axis) so that the collection reservoir 39 or third waste reservoir 49 or elution reagent reservoir 59 is positioned under the free end of the intermediate conduit 51 thus fluidly connecting collection reservoir 39, or third waste reservoir 49, or elution reagent reservoir 59, to the intermediate conduit 51.

The storage conduit 30, x-y table 50, second buffer reservoir 19 (e.g. the second syringe pump 19), third selection valve 18, intermediate conduit 51, the sample reservoir 29, collection reservoir 39, third waste reservoir 49, and elution reagent reservoir 59, can be considered to collectively define a unit 72.

In a variation of the embodiment, instead of the unit 72 (i.e. instead of the group of components including the storage conduit 30, x-y table 50, third selection valve 18, second buffer reservoir 19, intermediate conduit 51, the sample reservoir 29, collection reservoir 39, third waste reservoir 49, and elution reagent reservoir 59) any other suitable means for loading and storing sample fluid may be provided, such as an autosampler for example; for example the autosampler model such as "Alias" made by Spark Holland, NL. could be provided in the assembly 1 instead of said above-mentioned group of components. Preferably in this variation of the embodiment the assembly will further comprise a pump which is operably connected to the autosampler.

The microfluidic assembly 100 can be used to test a sample fluid which contains molecules which actively dissociate from the first ligands 4 in the first flow cell 2, thus the microfluidic assembly 1 can be used to implement a further exemplary method according to an further method embodiment of the present invention:

During use of the microfluidic assembly 100, to test a sample fluid which contains molecules which actively dissociate, said sample fluid which contains molecules which actively dissociate is provided in the sample reservoir 29.

The first selection valve 8 is then moved to its second position so that first selection valve 8 is closed and the second selection valve 28 is moved to its first position so that second selection valve 28 is open. The plunger 9a is plunged into the receptacle 9a so that buffer fluid is released from the first syringe pump 9. The buffer fluid flows out of the first syringe pump 9, through the first subsidiary conduit 10, into the first portion 5a of the first conduit 5, and into the first flow cell 2 and into the second conduit 15, and into the second waste reservoir 27.

The x-y table 50 is then moved so that the sample reservoir 29 is fluidly connected with the intermediate conduit 51.

The third selection valve 18 is then moved to its first position so that the intermediate conduit 51 is fluidly connected with the storage conduit 30 via the third selection valve. With the third selection valve 18 in its first position, the plunger 19a of the second syringe pump 19 is moved in a direction out of receptacle 19b so as to create a negative pressure in the storage conduit 30. As a result sample fluid is aspirated from the sample reservoir 29, into the intermediate conduit 51, and into the storage conduit 30 via the third selection valve 18.

Preferably the volume of sample fluid which is aspirated from the sample reservoir 29, into the intermediate conduit 51, and into the storage conduit 30 via the third selection valve 18 is between three times the internal volume of the second subsidiary conduit 20 and the internal volume of the storage conduit 30; most preferably it is between five times the internal volume of the second subsidiary conduit 20 and the internal volume of the storage conduit 30.

Optionally, next the third selection valve 18 is moved to its second position so that the third selection valve 18 fluidly connects the storage conduit 30 and the second subsidiary conduit 20. Optionally, the plunger 19a is plunged into the receptacle 19b of the second syringe pump 19 so as to force buffer fluid out of the second syringe pump 19. The buffer fluid which is released from the second syringe pump 19 pushes some of the sample fluid out of the storage conduit 30 and into the second subsidiary conduit 20. Since the first selection pump 8 is closed, pressure provided by buffer fluid which is present in the first portion 15a of the second conduit 15 will prevent the sample fluid from flowing along the first portion 15a of the second conduit 15 towards the first flow cell 2; furthermore since the second selection valve 28 is in its first position so that second selection valve 28 is open, the sample fluid will flow from the second subsidiary conduit and into the second portion 15b of the second conduit 15 and into the second waste reservoir 27 via the second selection valve 28.

Preferably pressure provided by the buffer fluid present in the first portion 15a of the second conduit 15 prevents the sample fluid from flowing along the first portion 15a of the second conduit 15 into the first flow cell 2. In some cases a negligible amount of sample fluid may move by diffusion along a portion of the first portion 15a of the second conduit 15. In one embodiment, in order to prevent or at least minimize the diffusion of sample fluid along a portion of the first portion 15a of the second conduit 15, preferably the flow of buffer fluid from the first buffer reservoir 9 through the first flow cell 2 and into the second waste reservoir 27 is maintained as the sample fluid is flowing from the storage conduit 30, along the second subsidiary conduit 20 and into the second waste reservoir 27.

Preferably, the volume of sample fluid which is allowed to flow from the storage conduit 30, along the second subsidiary conduit 20 and into the second waste reservoir 27, is more than twice the volume of the second subsidiary conduit 20, but less than the volume of sample fluid which has been previously aspirated from the sample reservoir 29, into the intermediate conduit 51, and into the storage conduit 30 via the third selection valve 18. Thus preferably there is some sample fluid remaining in the storage conduit 30.

Thus preferably at this stage the second subsidiary conduit 20 is effectively rinsed by the sample fluid. Thus preferably at this stage the first subsidiary conduit 10, the first portion 5a of the first conduit 5, the first flow cell 2, and the first portion 15a of the second conduit 15 all contain buffer fluid only; while preferably the second subsidiary conduit 20 contains sample fluid only, and the second portion 15b of the second conduit 15 contains at least some sample fluid. It highlighted that the steps described in paragraphs 102-105 are optional and, although are preferable said steps are not essential to the present invention.

Next the first selection valve 8 is moved to its second position (i.e. the first selection valve 8 is opened) so that fluid can pass from first conduit 5 into the first waste reservoir 7 and preferably the second selection valve 28 is moved to its second position so that it is closed. With the third selection valve 18 still in its second position, the plunger 19a is plunged into the receptacle 19b of the second syringe pump 19 so as to force more buffer fluid out of the second syringe pump 19. The buffer fluid which is released from the second syringe pump 19 pushes a portion of, or all of, the sample fluid remaining in the storage conduit, out of the storage conduit 30 and into the second subsidiary conduit 20. Since the first selection valve 8 is in its second position (i.e. the first selection valve 8 is open) the buffer fluid present in the first portion 15a of the second conduit 15 no longer provides a pressure which prevents the sample fluid from flowing along the first portion 15a of the second conduit 15 into the first flow cell 2. Accordingly the sample fluid which is now passing into the second subsidiary conduit 20 flows into the first portion 15a of the second conduit 15, into the first flow cell 2, and along the first conduit 5, and into the first waste reservoir 7 via the first selection valve 8. As it flows, the sample fluid also flushes out any buffer fluid present in the first portion 15a of the second conduit 15, the first flow cell 2, and the first portion 5a of the first conduit 5, into the first waste reservoir 7.

Thus, at this stage the second subsidiary conduit 20, the first portion 15a of the second conduit 15, the first flow cell 2, and the first conduit 5 all contain sample fluid only. Advantageously, since prior to moving the first selection valve 8 to its second position there is sample fluid already present in the second subsidiary conduit 20, this allows the concentration of sample fluid within the first flow cell 2 to increase quickly when the first selection valve 8 is moved to its second position. When the sample fluid passes over the first surface 3 of the first flow cell 2, molecules which have a predefined characteristic necessary to allow them to bind with the first ligands 4 on the surface, will bind with the first ligands 4.

Next the first selection valve 8 is moved to its second position so that first selection valve 8 is closed and the second selection valve 28 is moved to its first position so that the second selection valve is opened. Preferably the third selection valve 18 is still in its second position so that the third selection valve 18 fluidly connects the storage conduit 30 and the second subsidiary conduit 20, but the position of the plunger 19a is fixed so as to prevent the flow of fluid into or out of the receptacle 19b of the second syringe pump 19.

Next the plunger 9a of the first syringe pump 9 is then plunged into the receptacle 9b so that buffer fluid is released from the first syringe pump 9. The buffer fluid released from the first syringe pump 9 flows through the first subsidiary conduit 10, into the first portion 5a of the first conduit 5, though the first flow cell 2, and through the second conduit 15, and into the second waste reservoir 27 via the second selection valve 28.

Thus at this stage the storage conduit 30 contains buffer fluid which was provided by the second syringe pump 19 and may also contain some residual sample fluid; the first subsidiary conduit 10, the first portion 5b of the first conduit 5, the first flow cell 2, and the second conduit 15 all contain buffer fluid only which was provided by the first syringe pump 9; and the second subsidiary conduit 20 and the second portion 5b of the first conduit 5 contains sample fluid only.

Next the first selection valve 8 is moved to its first position so that first selection valve 8 is opened and the second selection valve 28 is moved to its second position so that the second selection valve is closed. Preferably the third selection valve 18 is still in its second position so that the third selection valve 18 fluidly connects the storage conduit 30 and the second subsidiary conduit 20, but the position of the plunger 19a is fixed so as to prevent the flow of fluid into or out of the receptacle 19b of the second syringe pump 19.

Next the plunger 9a of the first syringe pump 9 is then plunged into the receptacle 9b so that buffer fluid is released from the first syringe pump 9. The buffer fluid released from the first syringe pump 9 flows through the first subsidiary conduit 10, into the second portion 5b of the first conduit 5, and into the first waste reservoir 7 via the first selection valve 8.

Thus at this stage the storage conduit 30 contains buffer fluid which was provided by the second syringe pump 19 and may also contain some residual sample fluid; the first subsidiary conduit 10, the first portion 5b of the first conduit 5, second portion 5b of the first conduit 5, the first flow cell 2, and the second conduit 15 all contain buffer fluid only which was provided by the first syringe pump 9; and the second subsidiary conduit 20 contains sample fluid only.

Next the x-y table 50 is moved so that the third waste reservoir 49 is fluidly connected with the intermediate conduit 51. The third selection valve 18 is then moved to its first position so that the intermediate conduit 51 is fluidly connected with the storage conduit 30 via the third selection valve 18. The plunger 19a is plunged into the receptacle 19b of the second syringe pump 19 so as to force more buffer fluid out of the second syringe pump 19. The buffer fluid which is released from the second syringe pump 19 pushes the buffer fluid in the storage conduit 30, and any sample solution which is remaining in the storage conduit 30, out of the storage conduit 30 and into the third waste reservoir 49 via the third selection valve 18 and the intermediate conduit 51. Thus during this step the buffer fluid which is released from the second syringe pump 19 flushes out any sample fluid which is present in the storage conduit 30 and the intermediate conduit 51. Accordingly, after this step the storage conduit 30 and the intermediate conduit 51 both contain no sample fluid (and preferably contain buffer fluid only).

Next the first selection valve 8 is moved to its second position so that first selection valve 8 is closed and the second selection valve 28 is moved to its first position so that the second selection valve is opened. With the third selection valve 18 still in its second position so that the third selection valve 18 fluidly connects the storage conduit 30 and the second subsidiary conduit 20, the plunger 19a is plunged into the receptacle 19b of the second syringe pump 19 so as to force more buffer fluid out of the second syringe pump 19. The buffer fluid which is released from the second syringe pump 19 pushes the buffer fluid in the storage conduit 30 out of the storage conduit 30 and into the second subsidiary conduit 20. The buffer fluid flows from the storage conduit 30, into the second subsidiary conduit 20, the second portion 15b of the second conduit 15 and subsequently into the second waste reservoir 27.

Thus during this step the buffer fluid flushes out any sample fluid which is present in the second subsidiary conduit 20 into the second waste reservoir 27. Thus at this stage the storage conduit 30, second subsidiary conduit 20, second conduit 15, first flow cell 2, first conduit 5, and first subsidiary conduit 10 have all be flushed out with buffer fluid. All, or at least the majority, of molecules which became bound to first ligands 4 in the first flow cell remain bound since the majority of bound molecules do not passively dissociate.

The x-y table 50 is then moved so that the elution reagent reservoir 59 is fluidly connected with the intermediate conduit 51.

The third selection valve 18 is moved to its first position so that the intermediate conduit 51 is fluidly connected with the storage conduit 30 via the third selection valve 18. With the third selection valve 18 in its first position, the plunger 19a of the second syringe pump 19 is moved in a direction out of receptacle 19b so as to create a negative pressure in the storage conduit 30. As a result regeneration fluid is aspirated from the elution reagent reservoir 59, into the intermediate conduit 51, and into the storage conduit 30 via the third selection valve 18.

Next, the second selection valve 18 is closed (the first selection valve 8 is already closed from a previous step) so that both the first and second selection valves 8, 18 are both closed. The third selection valve 18 is moved to its second position so that the third selection valve 18 fluidly connects the storage conduit 30 and the second subsidiary conduit 20. Subsequently the plunger 19a is plunged into the receptacle 19b of the second syringe pump 19 so as to force more buffer fluid out of the second syringe pump 19, and simultaneously the plunger 9a of the first syringe pump 9 is moved in a direction out of receptacle 9b so as to create a negative pressure in the first subsidiary conduit 10. The buffer fluid which is released from the second syringe pump pushes the regeneration fluid which is in the storage conduit 30, out of the storage conduit 30, and into the second subsidiary conduit 20 via the third selection valve 18.

Due to the force applied to the regeneration fluid by the buffer fluid which is released from the second syringe pump 19, and the negative pressure which is created in the first subsidiary conduit 10 by the first syringe pump 9, the regeneration fluid flows, along the second subsidiary conduit 20, through the first portion 15a of the second conduit 15, through the first flow cell 2, through the first portion 5a of the first conduit 5, and along the first subsidiary conduit 10 towards the first syringe pump 9. In the most favourable embodiment the regeneration fluid flows until the first syringe pump 9 but not into the receptacle 9b of the first syringe pump.

Importantly, as the regeneration fluid flows through the first flow cell 2 it will cause molecules which are bound to first ligands 4 to become disassociated from their respective first ligands 4. The disassociated molecules will collect in the regeneration fluid which flows through the first flow cell 2. Accordingly after this step the regeneration fluid which is present in the first flow cell 2, the first portion 5a of the first conduit 5, and first subsidiary conduit 10 will contain molecules which were bound to and actively dissociated from first ligands 4 in the first flow cell 2.

Next the second selection valve 28 is moved to its first position so that the second selection valve is opened (the first selection valve 8 is already in its second position so that first selection valve 8 is closed). Preferably the position of the plunger 9*a* of the first syringe pump 9 is fixed so as to prevent the flow of fluid into or out of the receptacle 9*b* of the first syringe pump 9. With the third selection valve 18 still in its second position so that the third selection valve 18 fluidly connects the storage conduit 30 and the second subsidiary conduit 20, the plunger 19*a* is plunged into the receptacle 19*b* of the second syringe pump 19 so as to force buffer fluid out of the second syringe pump 19. The buffer fluid which is released from the second syringe pump 19 flows through the storage conduit 30, through the second subsidiary conduit 20, and through the second portion 15*b* of the second conduit 15, and into the second waste reservoir 27 via the second selection valve 28. Thus the buffer fluid flushes out any regeneration fluid residing in the storage conduit 30 and second subsidiary conduit 20 into the second waste reservoir 27.

Thus, preferably, at this stage the storage conduit 30, second subsidiary conduit 20, and the second portion 15*b* of the second conduit 15 contain buffer fluid only; while the first portion 15*a* of the second conduit 15, first flow cell 2, first portion 5*a* of the first conduit 5, and the first subsidiary conduit 10, all contain regeneration fluid. In particular the first flow cell 2, first portion 5*a* of the first conduit 5, and the first subsidiary conduit 10, all contain regeneration fluid which contains molecules which were bound to first ligands 4 in the first flow cell 2.

Next the x-y table 50 is moved so that the third waste reservoir 49 is fluidly connected with the intermediate conduit 51. The third selection valve 18 is then moved to its first position so that the intermediate conduit 51 is fluidly connected with the storage conduit 30 via the third selection valve 18. The plunger 19*a* is plunged into the receptacle 19*b* of the second syringe pump 19 so as to force buffer fluid out of the second syringe pump 19. The buffer fluid which is released from the second syringe pump 19 flows through the storage conduit 30 and into the third waste reservoir 49 via the third selection valve 18. The buffer fluid will flush out any residual regeneration fluid in the storage conduit 30 and the intermediate conduit 51 into the third waste reservoir 49. Accordingly, after this step the storage conduit 30 and the intermediate conduit 51 contain no regeneration fluid (and preferably contain buffer fluid only).

Next the regeneration fluid present in the first flow cell 2, first portion 5*a* of the first conduit 5, and the first subsidiary conduit 10, which contains molecules which were bound to first ligands 4 in the first flow cell 2, is collected. To do this the both the second selection valve 28 is moved to its second position so that the first and second selection valves 8,28 are both closed (the first selection valve 8 is already closed from a previous step), and the third selection valve 18 is moved to its second position so that the third selection valve 18 fluidly connects the storage conduit 30 and the second subsidiary conduit 20. Subsequently the plunger 9*a* is plunged into the receptacle 9*b* of the first syringe pump 9 so as to force more buffer fluid out of the first syringe pump 9, and simultaneously the plunger 19*a* of the second syringe pump 19 is moved in a direction out of receptacle 19*b* so as to create a negative pressure in the storage conduit 30.

Due to the force applied to the regeneration fluid by the buffer fluid which is released from the first syringe pump 9, and the negative pressure which is created in the storage conduit 30 by the second syringe pump 19, buffer fluid which is released from the first syringe pump 9 pushes the regeneration fluid which is in the first subsidiary conduit 10, first portion 5*a* of the first conduit 5, and first flow cell 2, into the storage conduit 30.

Next the x-y table 50 is moved so that the collection reservoir 39 is fluidly connected with the intermediate conduit 51.

The third selection valve 18 is then moved to its first position so that the intermediate conduit 51 is fluidly connected with the storage conduit 30 via the third selection valve.

With the third selection valve 18 in its first position, the plunger 19*a* of the second syringe pump 19 is plunged into the receptacle 19*b* so that buffer fluid is released from the second syringe pump 19 into the storage conduit 30. The buffer fluid which is released from the second syringe pump 19 pushes the regeneration fluid having said molecules (i.e. the molecules which have actively dissociated from their respective first ligands 4) out of the storage conduit 30 and into the collection reservoir 39. Thus at this stage the molecules which were bound the first ligands 4 (or at least the majority of the molecules which were bound the first ligands 4) have been isolated from the rest of sample solution.

The regeneration fluid (containing said dissociated molecules) can be taken from the collection reservoir 39, and provided to an analytical device which is configured to determine/identify the molecules which are present in the regeneration fluid; and thus ultimately determine/identify the molecules which were bound to the first ligands 4 within the first flow cell 2 and became dissociated from the respective first ligands 4 by the regeneration fluid; for example the analytical device may be a mass spectrometer, the mass spectrometer is used to identify which molecules are contained in the regeneration fluid, thus identifying the molecules which were bound to the first ligands 4 in the first flow cell 2 and became dissociated from the respective first ligands 4 by the regeneration fluid.

Advantageously since, prior to aspirating the regeneration fluid (containing said dissociated molecules) into the storage conduit 30, sample fluid present in the storage conduit 30, second subsidiary conduit 20, first portion 15*a* of the second conduit 15, first flow cell 2, and first conduit 5, was flushed out using a buffer solution, the regeneration fluid (containing said dissociated molecules) which ends up in the collection reservoir 39) will not be contaminated by residual sample fluid which could otherwise be present in these parts of the microfluidic assembly 100. Thus only molecules present in the sample fluid which were bound to the first ligands 4 will be present in the regeneration fluid which is aspirated into the collection reservoir 39. The regeneration fluid which is aspirated into the collection reservoir 39 is preferably passed to an analytical device where the molecules in regeneration fluid are identified.

In a variation of the above described exemplary method carried out using the assembly 100, the first flow cell 2 may be replaced with another flow cell which comprises a different type of ligands (i.e. ligands which can bind to molecules which have a different predefined characteristic). For example negative control ligands having a specific mutation resulting in a deactivation of the binding site of interest and the above steps are repeated to test the sample fluid. The results of this text may be compared to the results of the previous test to determine non-specific binders; for example if molecules can be identified to bind to the ligands in the first test but also bind to the negative control ligands in the second test, these molecules can be considered to bind non-specifically.

Figure 3:
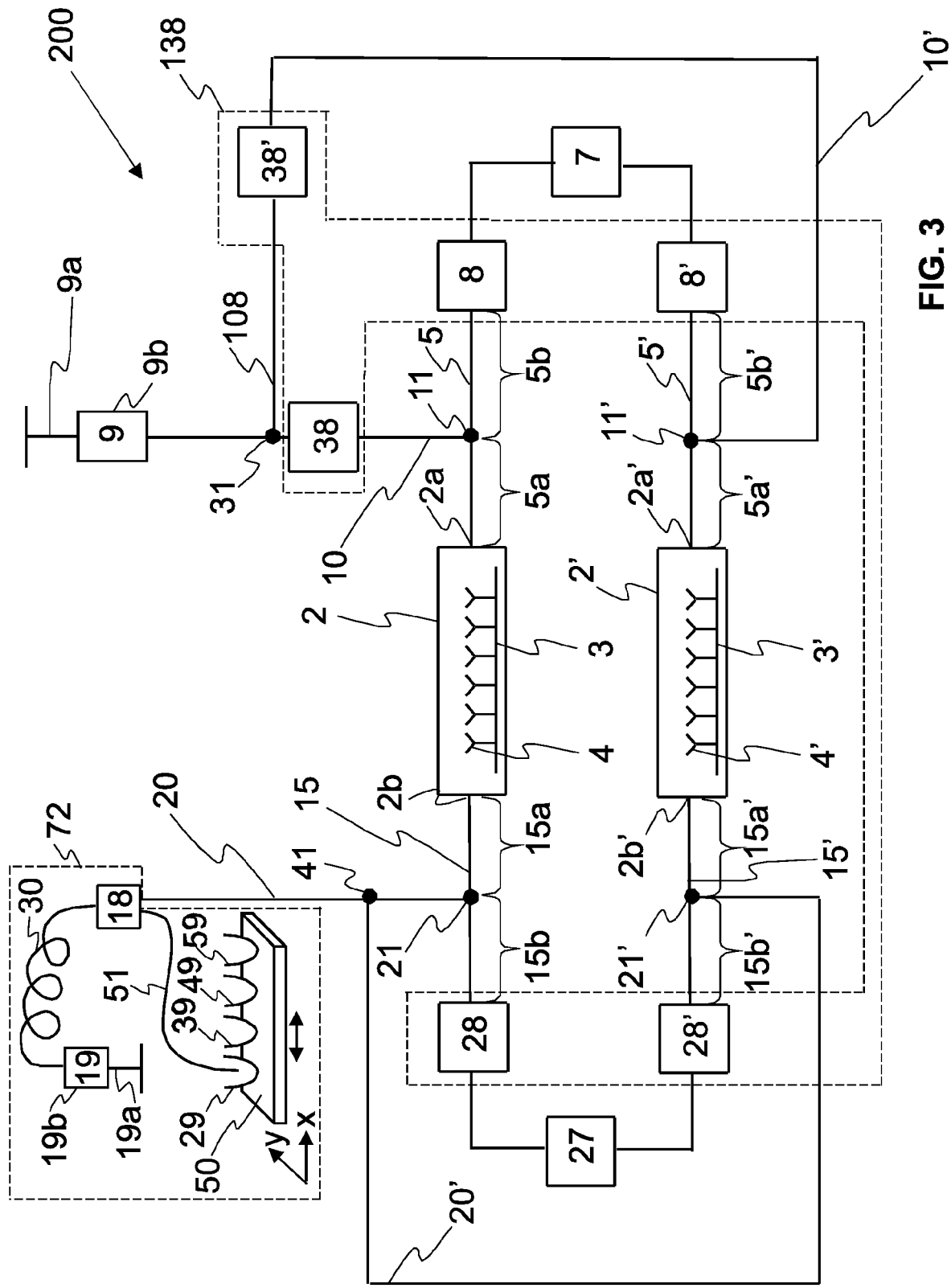
FIG. 3 provides a schematic view of a microfluidic assembly according to another embodiment of the present invention.

FIG. 3 illustrates a microfluidic assembly 200 according to a further embodiment of the present invention which comprises a second flow cell 2' comprising a second surface 3' with second ligands 4'. The second ligands 4' can be negative control ligands, or of the same or similar type as the first ligands 4. Advantageously, the microfluidic assembly 200 allows selective recovery of bound molecules either from the first flow cell 2, or from the second flow cell 2', or jointly from both flow cells, as described below.

The microfluidic assembly 200 further comprises a third conduit 5', one end of which is fluidly connected to a first fluid port 2a' of the second flow cell 2' and the other end of which is fluidly connected to a fourth selection valve 8'. The fourth selection valve 8' can selectively fluidly connect the third conduit 5' to the first waste reservoir 7. The fourth selection valve 8' is moveable between a first position and second position; when the fourth selection valve 8' is in its first position, the fourth selection valve 8' allows fluid to pass from the third conduit 5' into the first waste reservoir 7; and when the fourth selection valve 8' is in its second position fourth selection valve 8' is closed thus preventing the flow of fluid out of the third conduit 5' via the fourth selection valve 8'.

The microfluidic assembly 200 further comprises a fourth conduit 15', one end of which is fluidly connected to a second fluid port 2b' of the second flow cell 2' and the other end of which is fluidly connected to a fifth selection valve 28'; the fifth selection valve 28' can selectively fluidly connect the third conduit 5' to the second waste reservoir 27. The fifth selection valve 28' is moveable between a first position and second position; when the fifth selection valve 28' is in its first position, the fifth selection valve 28' allows fluid to pass from the third conduit 5' into the second waste reservoir 27; and when the fifth selection valve 28' is in its second position, the fifth selection valve 28' is closed thus preventing the flow of fluid out of the third conduit 5' into the second waste reservoir 27.

The microfluidic assembly 200 further comprises a sixth selection valve 38, which located along the first subsidiary conduit 10 between the first buffer reservoir 9 and the first junction 11 the. The sixth selection valve 38 is moveable between a first position and second position; when the sixth selection valve 38 is in its first position, the sixth selection valve 38 allows fluid to pass from the first buffer reservoir 9 into the first junction 11 and thus into the first conduit 5; and when the sixth selection valve 38 is in its second position sixth selection valve 38 is closed thus preventing the flow of fluid from the first buffer reservoir 9 into the first junction 11 and vice versa.

The microfluidic assembly 200 further comprises a seventh selection valve 38', which can selectively fluidly connect the first subsidiary conduit 10 (and thus the first buffer reservoir 9) to a third subsidiary conduit 10'; the third subsidiary conduit 10' is connected to the third conduit 5' at a third junction 11'. In this example the third subsidiary conduit 10' is arranged perpendicular to the third conduit 5' such that third junction 11' is a T-shaped junction 11'; however it will be understood that the third junction 11' may take any shape or configuration.

The seventh selection valve 38' is moveable between a first position and second position; when the seventh selection valve 38' is in its first position, the seventh selection valve 38' allows fluid to pass from the buffer reservoir 9 into the first subsidiary conduit 10, and from the first subsidiary conduit 10 into the third subsidiary conduit 10' and thus into the third conduit 5'; and when the seventh selection valve 38' is in its second position seventh selection valve 38' is closed thus preventing the flow of fluid from the first subsidiary conduit 10 (and thus from the buffer reservoir 9) into the third subsidiary conduit 10' and vice versa.

The portion of the third conduit 5' which is located between the first fluidic port 2a' of the second flow cell 2' and the third junction 11' will be referred to as the first portion 5a' of the third conduit 5', and the portion of the third conduit 5' which is located between the third junction 11' and the fourth selection valve 8' will be referred to as the second portion 5b' of the third conduit 5'. In the preferred embodiment the first portion 5a' of the third conduit 5' is configured to have a lower volume than the volume of second portion 5b' of the third conduit 5'.

As for the assemblies 1, 100 shown in FIGS. 1 and 2, the assembly 200 comprises the unit 72; the unit 72 comprises suitable means for loading and storing sample fluid (as described for the embodiments shown in FIGS. 1 and 2). The unit 72 has the same configuration as the assemblies 1, 100 of FIGS. 1 and 2. The unit 72 is fluidly connected to the second junction 21 via the second subsidiary conduit 20. The assembly 200 further comprises a fourth conduit 15' which is connected to the second subsidiary conduit 20 and connected to the fourth conduit 15', thus the fourth conduit 15' fluidly connects the second subsidiary conduit 20 to the fourth conduit 15'. The fourth subsidiary conduit 20' connect to the fourth conduit 15' at a fourth junction 21'. In this example the fourth subsidiary conduit 20' is arranged perpendicular to the fourth conduit 15' such that fourth junction 21' is a T-shaped junction 21'; however it will be understood that the fourth junction 21' may take any shape or configuration.

As illustrated in FIG. 3, the fourth subsidiary conduit 20' is connected to the second subsidiary conduit 20 at a sixth junction 41. In this example the fourth subsidiary conduit 20' is arranged perpendicular to the second subsidiary conduit 20 such that sixth junction 41 is a T-shaped junction 41; however it will be understood that the sixth junction 41 may take any shape or configuration. In this embodiment the sixth junction 41 is valveless (i.e. there is no valve present at the sixth junction 41).

The seventh selection valve 38' is connected to the first subsidiary conduit 10 via an intermediate conduit 108. The intermediate conduit 108 is connected to the first subsidiary conduit 10 at a fifth junction 31. In this example the intermediate conduit 108 is arranged perpendicular to the first subsidiary conduit 10 such that the fifth junction 31 is a T-shaped junction 31; however it will be understood that the fifth junction 31 may take any shape or configuration.

The portion of the fourth conduit 15' which is located between the second fluid port 2b' of the second flow cell 2' and the fourth junction 21' will be referred to as first portion 15a' of the fourth conduit 15', and the portion of the fourth conduit 15' which is located between the fourth junction 21' and fifth selection valve 28' will be referred to as the second portion 15b' of the fourth conduit 15'. In the preferred embodiment first portion 15a' of the fourth conduit 15' has a much lower volume than the second portion 15b' of the fourth conduit 15'.

Advantageously, in the embodiment shown in FIG. 3, fluid can be passed from the unit 72 to any of the first flow cell 2 or the second flow cell 2' without passing through any valves; thus there is no need for rinsing any dead volume which would otherwise be present in such valves when exchanging the analyte fluids. A subsequent advantage is that because fluid can be passed from the unit 72 to any of the first flow cell 2 or the second flow cell 2' without passing through any valves, all of the valves which are present in the microfluidic assembly 200 do not need to be rinsed and thus can be constructed from commercially available standard valves, eliminating the need for miniaturized micro valves with reduced inner volume.

Figure 4:
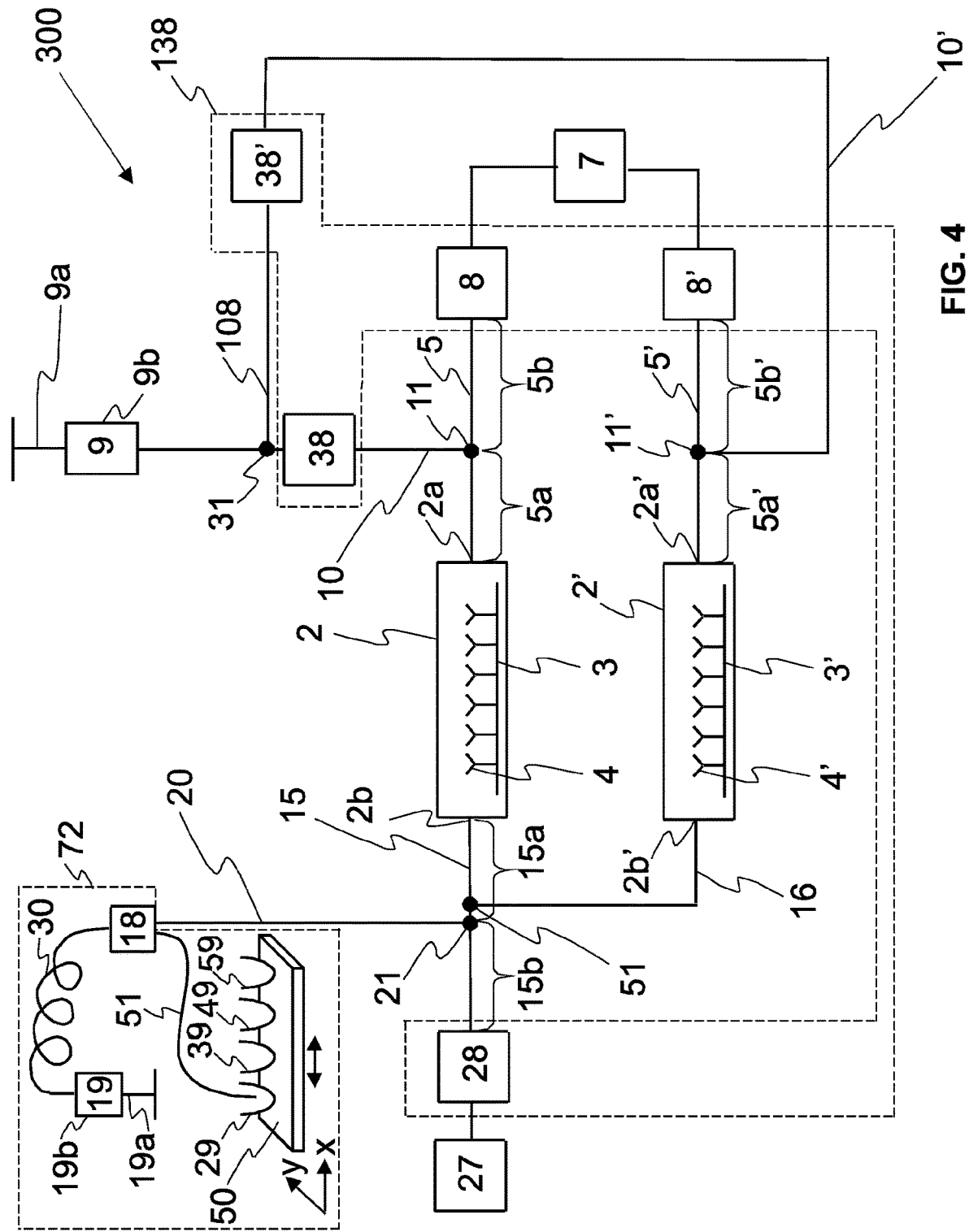
FIG. 4 provides a schematic view of a microfluidic assembly according to another embodiment of the present invention.

In a variation of the above described exemplary embodiment in assembly 200, certain valves may be omitted in order to reduce the total number of valves. FIG. 4 illustrates a microfluidic assembly 300 according to a further embodiment of the present invention. The microfluidic assembly 300 has many of the same features as the microfluidic assembly 200 shown in FIG. 3 and like features are awarded the same reference numbers. However, compared to the microfluidic assembly 200 the microfluidic assembly 300 does not comprises a fifth selection valve 28' and does not comprises a fourth conduit 15'.

In the microfluidic assembly 300, there is provided a fifth conduit 16 which is connected to the second conduit 15 and to the second fluid port 2b' of the second flow cell 2', so as to fluidly connect the second conduit 15 and the second flow cell 2'. The fifth conduit 16 is connected to the second conduit 15 at a seventh junction 51, while the other end of the fifth conduit 16 is connected to the second fluid port 2b' of the second flow cell 2'. In this example the seventh junction 51 is located between the second junction 21 and the second fluid port 2a of the first flow cell 2 (however it will be understood that the seventh junction 51 could be located at any other position along the second conduit 15). Locating the seventh junction 51 between the second junction 21 and the second fluid port 2a of the first flow cell 2 (i.e. locating the seventh junction 51 along the first portion 15a of the second conduit 15) facilitates a homogenous sample preparation when the unit 72 is fluidly connected to the second waste reservoir 27. In this example the fifth conduit 16 is arranged perpendicular to the second conduit 15 such that the seventh junction 51 is a T-shaped junction 51; however it will be understood that the seventh junction 51 may take any shape or configuration.

In an alternative embodiment, the seventh junction 51 is located at the same point along the second conduit 15 as the second junction 21; thus forming a four-way junction (or a cross-shaped i.e. "+" junction).

The operation of the microfluidic assemblies 200 and 300 shown in FIGS. 3 and 4 will now be described.

For conciseness of this description, it will be considered that for the microfluidic assembly 200 shown in FIG. 3 the first selection valve 8, second selection valve 28, the fourth selection valve 8', the fifth selection valve 28', the sixth selection valve 38 and the seventh selection valve 38' collectively define a flow steering valve unit 138; and for the microfluidic assembly 300 shown in FIG. 4 the first selection valve 8, second selection valve 28, the fourth selection valve 8', the sixth selection valve 38 and the seventh selection valve 38' collectively define the flow steering valve unit 138.

In the microfluidic assembly 300 shown in FIG. 4 the flow steering valve unit 138 can be selectively configured to be in any of a first state, second state, third state, fourth state, fifth state, or a sixth state. In the microfluidic assembly 300 shown in FIG. 4 when the flow steering valve unit is configured to be in its first state then the second selection valve 28 and the sixth selection valve 38 are in their first position (i.e. 'open') while all other valves of the flow steering valve unit 138 are in their second position (i.e. closed), thus allowing fluid to flow from the second subsidiary conduit 20 to the second waste recipient 27, and allowing flow from the first buffer reservoir 9 through the first flow cell 2 to the second waste recipient 27, but preventing fluid flow through the second flow cell 2' or flow to the first waste recipient 7. When the flow steering valve unit 138 is in configured to be in its second state then first selection valve 8 and the sixth selection valve 38 are in their first position (i.e. 'open') while all other valves of the flow steering valve unit 138 are in their second position (i.e. 'closed'), thus allowing flow from the second subsidiary conduit 20 through the first flow cell 2 to the first waste recipient 7, and allowing flow from the first buffer reservoir 9 to the first waste recipient 7 but preventing fluid flow through the second flow cell 2' or flow to the second waste recipient 27. When the flow steering valve unit 138 is configured to be in its third state then, then the seventh selection valve 38' and the second selection valve 28 are in their first position (i.e. 'open') while all other valves of the flow steering valve unit 138 are in their second position (i.e. 'closed'), thus allowing flow from the fourth subsidiary conduit 20' to the second waste recipient 27, and allowing flow from the first buffer reservoir 9 through the second flow cell 2' to the second waste recipient 27 but preventing fluid flow through the first flow cell 2 or flow to the first waste recipient 7. When the flow steering valve unit 138 is configured to be in said fourth state then the fourth selection valve 8' and the seventh selection valve 38' are in their first position (i.e. 'open') while all other valves of the flow steering valve unit 138 are in their second position (i.e. 'closed'), thus allowing flow from the fourth subsidiary conduit 20' through the second flow cell 2' to the first waste recipient 7, and allowing flow from the first buffer reservoir 9 to the first waste recipient 7 but preventing fluid flow through the first flow cell 2 or flow to the second waste recipient 27. When the flow steering valve unit 138 is configured to be in its fifth state then the first selection valve 8 and the fourth selection valve 8' are in their second position (i.e. 'closed') while all other valves of the flow steering valve unit 138 are in their first position (i.e. 'open'), thus allowing flow from the second subsidiary conduit 20 and the fourth subsidiary conduit 20' to the second waste recipient 27, and allowing flow from the first buffer reservoir 9 through the first flow cell 2 and the second flow cell 2' to the second waste recipient 27, but preventing fluid flow to the first waste recipient 7. When the flow steering valve unit 138 is configured to be in its sixth state then the second selection valve 28 is in its second position (i.e. 'closed') while all other valves of the flow steering valve unit 138 are in their first position (i.e. 'open'), thus allowing flow from the second subsidiary conduit 20 through the first flow cell 2 to the first waste recipient 7 and from the fourth subsidiary conduit 20' through the second flow cell 2' to the first waste recipient 7, and allowing flow from the first buffer reservoir 9 to the first waste recipient 7, but preventing fluid flow to the second waste recipient 27.

In the microfluidic assembly 200 shown in FIG. 3 the flow steering valve unit 138 can be selectively configured to be in any of a first state, second state, third state, fourth state, fifth state, or a sixth state. In the microfluidic assembly 200 shown in FIG. 3 when the flow steering valve unit is configured to be in its first state then the second selection valve 28 and the sixth selection valve 38 are in their first position (i.e. 'open') while all other valves of the flow steering valve unit 138 are in their second position (i.e. closed), thus allowing fluid to flow from the second subsidiary conduit 20 to the second waste recipient 27, and allowing flow from the first buffer reservoir 9 through the first flow cell 2 to the second waste recipient 27, but preventing fluid flow through the second flow cell 2' or flow to the first waste recipient 7. When the flow steering valve unit 138 is in configured to be in its second state then first selection valve 8 and the sixth selection valve 38 are in their first position (i.e. 'open') while all other valves of the flow steering valve unit 138 are in their second position (i.e. 'closed'), thus allowing flow from the second subsidiary conduit 20 through the first flow cell 2 to the first waste recipient 7, and allowing flow from the first buffer reservoir 9 to the first waste recipient 7 but preventing fluid flow through the second flow cell 2' or flow to the second waste recipient 27. When the flow steering valve unit 138 is configured to be in its third state then, then the seventh selection valve 38' and the fifth selection valve 28' are in their first position (i.e. 'open') while all other valves of the flow steering valve unit 138 are in their second position (i.e. closed'), thus allowing flow from the fourth subsidiary conduit 20' to the second waste recipient 27, and allowing flow from the first buffer reservoir 9 through the second flow cell 2' to the second waste recipient 27 but preventing fluid flow through the first flow cell 2 or flow to the first waste recipient 7. When the flow steering valve unit 138 is configured to be in said fourth state then the fourth selection valve 8' and the seventh selection valve 38' are in their first position (i.e. 'open') while all other valves of the flow steering valve unit 138 are in their second position (i.e. 'closed'), thus allowing flow from the fourth subsidiary conduit 20' through the second flow cell 2' to the first waste recipient 7, and allowing flow from the first buffer reservoir 9 to the first waste recipient 7 but preventing fluid flow through the first flow cell 2 or flow to the second waste recipient 27. When the flow steering valve unit 138 is configured to be in its fifth state then the first selection valve 8 and the fourth selection valve 8' are in their second position (i.e. 'closed') while all other valves of the flow steering valve unit 138 are in their first position (i.e. 'open'), thus allowing flow from the second subsidiary conduit 20 and the fourth subsidiary conduit 20' to the second waste recipient 27, and allowing flow from the first buffer reservoir 9 through the first flow cell 2 and the second flow cell 2' to the second waste recipient 27, but preventing fluid flow to the first waste recipient 7. When the flow steering valve unit 138 is configured to be in its sixth state then the second selection valve 28 and the fifth selection valve 28' are in their second position (i.e. 'closed') while all other valves of the flow steering valve unit 138 are in their first position (i.e. 'open'), thus allowing flow from the second subsidiary conduit 20 through the first flow cell 2 to the first waste recipient 7 and from the fourth subsidiary conduit 20' through the second flow cell 2' to the first waste recipient 7, and allowing flow from the first buffer reservoir 9 to the first waste recipient 7, but preventing fluid flow to the second waste recipient 27. The microfluidic assemblies 200 and 300 can be used to implement an exemplary method according to a method embodiment of the present invention to test a sample fluid which contains molecules which passively or actively dissociate from the either of, or both of, the first ligands 4 within the first flow cell 2 and/or the second ligands 4' within the second flow cell 2'.

In one example, the flow steering valve unit 138 is configured so that the sample fluid flows through the first flow cell 2 only (and not through the second flow cell 2'). Said sample fluid most preferably contains molecules which passively or actively dissociate from the first ligands 4 within the first flow cell 2. In this example the flow steering valve unit 138 is first configured to be in its first state. The unit 72 is then configured to release sample fluid (as described for the embodiments of FIGS. 1 and 2); the released sample fluid flow into the second waste reservoir 27 through the second subsidiary conduit 20, the second portion 15b of the second conduit 15 and the second selection valve 28. Optionally, next the plunger 9a is plunged into the receptacle 9a so that buffer fluid is released from the first syringe pump 9. The buffer fluid flows out of the first syringe pump 9 through the first subsidiary conduit 10, the sixth selection valve 38 and the first portion 5a of the first conduit 5 into the first flow cell 2, and from there through the second conduit 15 and the second selection valve 28 into the second waste reservoir 27.

Thus, with respect to the assembly 200 in FIG. 3 and the assembly 300 in FIG. 4, during the above mentioned steps, the second subsidiary conduit 20 is effectively rinsed by the sample fluid.

Next, the flow steering valve unit 138 is configured to be in its second state. The unit 72 is then configured to release sample fluid (as described for the embodiments of FIGS. 1 and 2); the released sample fluid flows through into the first flow cell 2 through the second subsidiary conduit 20 and the first portion 15a of the second conduit 15, and from there through the first conduit 5 and the first selection valve 8 into the first waste reservoir 7.

Thus at this stage the first flow cell 2 contains sample fluid; the molecules in the sample fluid contained within the first flow cell 2 can bind to the first ligands 4 within the first flow cell 2.

Next, the flow steering valve unit 138 is configured into its first state. The unit 72 is then configured to release buffer fluid (as described for the embodiments of FIGS. 1 and 2). The releases buffer fluid flows to second waste reservoir 27 through the second subsidiary conduit 20, the second portion 15b of the second conduit 15 and the second selection valve 28 to flush out sample fluid which is present in the second subsidiary conduit 20. Thus, at this stage, with respect to the assembly 200 in FIG. 3 and with respect to the assembly 300 in FIG. 4, the first flow cell 2 contains sample fluid; during the above mentioned steps, the second subsidiary conduit 20 is effectively rinsed by the buffer fluid.

Next, optionally the flow steering valve unit 138 is configured into its second state, and the plunger 9a may be plunged into the receptacle 9a so that buffer fluid is released from the first syringe pump 9; the release buffer fluid flows through the first subsidiary conduit 10 and the sixth selection valve 38, the second portion 5b of the first conduit 5 and the first selection valve 8 into the first waste recipient 7.

Thus, at this stage, the first flow cell 2 contains sample fluid, and the remaining flow path is effectively rinsed by buffer fluid, with exception of the first portion 5a of the first conduit 5 and the first portion 15a of the second conduit 15.

Next the flow steering valve unit 138 is then configured into its first state. Then buffer fluid is released from the first syringe pump 9 (as described for the embodiments of FIGS. 1 and 2). The released buffer fluid flows through the first subsidiary conduit 10, the first portion 5a of the first conduit 5, the first flow cell 2, the second conduit 15 and the second selection valve 28 and into the second waste recipient 27. In the preferred embodiment, and in particular for the recovering passively dissociating molecules, the buffer fluid is allowed to flow through the first flow cell 2 for a period between 10 milliseconds and 10 seconds; preferably, the buffer fluid is allowed to flow through the first flow cell 2 for a period between 0.1-2 seconds; most preferably the buffer fluid is allowed to flow through the first flow cell 2 for a period of 0.5 seconds.

Next the sixth selection valve 38 is moved into its first position ('open') and the seventh selection valve 38' is moved into its second position ('closed') so that fluid can flow from or to the first syringe pump 9 through the first flow cell 2 via the sixth selection valve 38, and so that the seventh valve 38' prevents the flow of fluid from or to the first syringe pump 9 through the second flow cell 2'.

Next, for recovering actively dissociating molecules, the unit 72 is configured to release regeneration fluid (i.e. regeneration solution, such as for example Glycine at low pH) (as described for the embodiment in FIG. 2); and the first syringe pump 9 is configured to aspirate the regeneration fluid from the unit 72 through the second subsidiary conduit 20, the first portion 15a of the second conduit 15, into the first flow cell 2. The regeneration fluid forces the molecules which have been bound to the first ligands 4 in the first flow cell 2 to become disassociated from the first ligands 4. The regeneration fluid flows from the first flow cell 2 through the first portion 5a of the first conduit 5, the first subsidiary conduit 10 and the sixth selection valve 38 until it reaches the first syringe pump 9. Importantly, as the regeneration fluid flows through the first flow cell 2 it will cause molecules which are bound to the respective first ligands 4 in the first flow cell 2 to become disassociated from their first ligands 4. The disassociated molecules will collect in the regeneration fluid which flows through the first flow cell 2. Accordingly after this step the regeneration fluid which is present in the first flow cell 2, the first portion 5a of the first conduit 5 and the first subsidiary conduit 10 will contain molecules which were bound to and actively dissociated from the first ligands 4 in the first flow cell 2.

Next, the first syringe pump 9 is configured to dispense buffer fluid, and the unit 72 is configured to aspirate, resulting in a flow of the regeneration fluid from before the first syringe pump 9 through the first subsidiary conduit 10 and the first portion 5a of the first conduit 5 into the first flow cell 2, and from there through the first portion 15a of the second conduit 15 and the second subsidiary conduit 20 into the unit 72. Thus, the regeneration fluid containing the dissociated molecules may be collected in the collection reservoir 39 of the unit 72.

In case of passively dissociating molecules no regeneration fluid is used in the assemblies 200,300 because the molecules will passively disassociate from the first ligands 4' in the first flow cell 2 without the need to be actively disassociated by a regeneration fluid. Therefore, for recovering passively dissociating molecules, when the sixth selection valve 38 is in its first position ('open') and the seventh selection valve 38' is in its second position ('closed'), the first syringe pump 9 is configured to dispense buffer fluid, and the unit 72 is configured to aspirate, resulting in a flow of buffer fluid from the first syringe pump 9 through the first subsidiary conduit 10, the first portion 5a of the first conduit 5 into the first flow cell 2, and from there through the first portion 15a of the second conduit 15 and the second subsidiary conduit 20 into the unit 72. Thus the buffer fluid which was released by the first syringe pump 9 into the first flow cell 2 will collect, within the first flow cell 2, the molecules which have become dissociated (i.e. passively dissociated) from the second ligands 4; the buffer fluid containing the collected dissociated molecules, will flow from the first flow cell 2 into the collection reservoir 39 of the unit 72.

The fluid (buffer fluid in the case of passively disassociating molecules, or, regeneration fluid in the case of actively disassociating molecules) containing said dissociated molecules which has been collected in the collection reservoir 39 of the unit 72 can be provided to an analytical device which is configured to determine/identify the molecules which are present in the fluid; and thus ultimately determine/identify the molecules which were bound to the ligands within the addressed flow cells and became dissociated from the respective ligands.

In one example, the flow steering valve unit 138 is configured so that the sample fluid flows through the second flow cell 2' only (and not through the first flow cell 2). Said sample fluid most preferably contains molecules which passively or actively dissociate from the second ligands 4' within the second flow cell 2'. In this example the flow steering valve unit 138 is first configured to be in its third state. The unit 72 is then configured to release sample fluid into the second waste reservoir 27. With respect to the assembly 200 in FIG. 3, the sample fluid flows through the second subsidiary conduit 20, the fourth subsidiary conduit 20', the second portion 15b' of the fourth conduit 15' and the fifth selection valve 28' into the second waste reservoir 27. With respect to the assembly 300 in FIG. 4, the sample fluid flows through the second subsidiary conduit 20, the second portion 15b of the second conduit 15 and the second selection valve 28 into the second waste reservoir 27. Optionally, next the plunger 9a is plunged into the receptacle 9a so that buffer fluid is released from the first syringe pump 9. The buffer fluid flows out of the first syringe pump 9 through the third subsidiary conduit 10', seventh selection valve 38' and the first portion 5a' of the third conduit 5' into the second flow cell 2'. With respect to the assembly 200 in FIG. 3, the fluid flows from the second flow cell 2' through the fourth conduit 15' and the fifth selection valve 28' into the second waste reservoir 27. With respect to the assembly 300 in FIG. 4, the fluid flows from the second flow cell 2' through the fifth conduit 16 and a portion of the fourth conduit 15' and the second selection valve 28 into the second waste reservoir 27.

Thus, with respect to the assembly 200 in FIG. 3 during the above mentioned steps, the fourth subsidiary conduit 20' and the part of the second subsidiary conduit 20 between the unit 72 and the sixth junction 41 are effectively rinsed by the sample fluid; and with respect to the assembly 300 in FIG. 4 the second subsidiary conduit 20 is effectively rinsed by the sample fluid.

Next, the flow steering valve unit 138 is configured to be in its fourth state. The unit 72 is then configured to release sample into the second flow cell 2'. With respect to the assembly 200 in FIG. 3, the sample fluid flows from the unit 72 through the second subsidiary conduit 20, the fourth subsidiary conduit 20', and the first portion 15a' of the fourth conduit 15' into the second flow cell 2'. With respect to the assembly 300 in FIG. 4, the sample fluid flows from the unit 72 through the second subsidiary conduit 20 and the fifth conduit 16 into the second flow cell 2'. With respect to the assembly 200 in FIG. 3 and with respect to the assembly 300 in FIG. 4, from there the sample fluid flows through the third conduit 5' and the fourth selection valve 8' into the first waste reservoir 7.

Thus at this stage the second flow cell 2' contains sample fluid; the molecules in the sample fluid contained within the second flow cell 2' can bind to the second ligands 4' within the second flow cell 2'.

Next, the flow steering valve unit 138 is then configured into its third state. The unit 72 is then configured to release buffer fluid into the second waste reservoir 27. With respect to the assembly 200 in FIG. 3, the buffer fluid flows through the second subsidiary conduit 20, the fourth subsidiary conduit 20', the second portion 15b' of the fourth conduit 15' and the fifth selection valve 28' into the second waste reservoir 27. With respect to the assembly 300 in FIG. 4, the buffer fluid flows through the second subsidiary conduit 20, the second portion 15b of the second conduit 15 and the second selection valve 28 into the second waste reservoir 27. Thus, at this stage, with respect to the assembly 200 in FIG. 3 and with respect to the assembly 300 in FIG. 4, the second flow cell 2' contains sample fluid; during the above mentioned steps, the second subsidiary conduit 20 is effectively rinsed by the buffer fluid. With respect to the assembly 300 in FIG. 4, also the fourth subsidiary conduit 20' is effectively rinsed by the buffer fluid.

Next, optionally the flow steering valve unit 138 is configured into its fourth state, and the plunger 9a may be plunged into the receptacle 9a so that buffer fluid is released from the first syringe pump 9 through the third subsidiary conduit 10' and the seventh selection valve 38', the second portion 5b' of the third conduit 5' and the fourth selection valve 8' into the first waste recipient 7.

Thus, at this stage, the second flow cell 2' contains sample fluid, and the remaining flow path is effectively rinsed by buffer fluid, with exception of the first portion 5a' of the third conduit 5' and the first portion 15a' of the fourth conduit 15'.

Next the flow steering valve unit 138 is then configured to have its third state, then buffer fluid is released from the first syringe pump 9 through the third subsidiary conduit 10', the seventh selection valve 38' and the first portion 5a' of the third conduit 5' into the second flow cell 2. With respect to the assembly 200 in FIG. 3, the fluid flows from the second flow cell 2' through the fourth conduit 15' and the fifth selection valve 28' into the second waste reservoir 27. With respect to the assembly 300 in FIG. 4, the fluid flows from the second flow cell 2' through the fifth conduit 16 and a portion of the fourth conduit 15' and the second selection valve 28 into the second waste reservoir 27. In the preferred embodiment, and in particular for the recovering passively dissociating molecules, the buffer fluid is allowed to flow through the second flow cell 2' for a period between 10 milliseconds and 10 seconds; preferably, the buffer fluid is allowed to flow through the second flow cell 2' for a period between 0.1-2 seconds; most preferably the buffer fluid is allowed to flow through the second flow cell 2' for a period of 0.5 seconds.

Next the sixth selection valve 38 is moved into its second position ('closed') and the seventh selection valve 38' is moved into its first position ('open'), so that a flow from or to the first syringe pump 9 through the first flow cell 2 is restricted by the sixth selection valve 38, and that a flow from or to the first syringe pump 9 through the second flow cell 2' is not restricted by the seventh selection valve 38'.

Next, for recovering actively dissociating molecules, the unit 72 is configured to release regeneration fluid, and the first syringe pump 9 is configured to aspirate the regeneration fluid from the unit 72. With respect to the assembly 200 in FIG. 3, the fluid flows through the second subsidiary conduit 20, the fourth subsidiary conduit 20', into the first portion 15a' of the fourth conduit 15', and into the second flow cell 2'. With respect to the assembly 300 in FIG. 4, the fluid flows through the second subsidiary conduit 20 and the fifth conduit 16 into the second flow cell 2'. The regeneration fluid forces the molecules which have been bound to the ligands 4' in the second flow cell 2' to become disassociated from the second ligands 4'. The regeneration fluid flows from the second flow cell 2' to the first portion 5a' of the third conduit 5', the third subsidiary conduit 10' and the seventh selection valve 38' up to the first syringe pump 9. Importantly, as the regeneration fluid flows through the second flow cell 2 it will cause molecules which are bound to the respective second ligands 4' in the second flow cell 2' to become disassociated from their second ligands 4'. The disassociated molecules will collect in the regeneration fluid which flows through the second flow cell 2'. Accordingly after this step the regeneration fluid which is present in the second flow cell 2', the first portion 5a' of the third conduit 5' and the third subsidiary conduit 10' will contain molecules which were bound to and actively dissociated from the second ligands 4' in the second flow cell 2'.

Next, the first syringe pump 9 is configured to dispense buffer fluid, and the unit 72 is configured to aspirate, resulting in a flow of the regeneration fluid from before the first syringe pump 9 through the seventh selection valve 38' and the third subsidiary conduit 10' into the second flow cell 2'. With respect to the assembly 200 in FIG. 3, the buffer flows from the second flow cell 2' through the first portion 5a' of the third conduit 5', the fourth subsidiary conduit 20', the second subsidiary conduit 20, and into the unit 72. With respect to the assembly 300 in FIG. 4, the buffer flows from the second flow cell 2' through the fifth conduit 16, the second subsidiary conduit 20, and into the unit 72. Thus, the regeneration fluid containing the dissociated molecules may be collected in the collection reservoir 39 of the unit 72.

In case of passively dissociating molecules no regeneration fluid is used in the assemblies 200,300 because the molecules will passively disassociate from the second ligands 4' in the second flow cell 2' without the need to be actively disassociated by a regeneration fluid. Therefore, for recovering passively dissociating molecules, when the sixth selection valve 38 is in its second position ('closed') and the seventh selection valve 38' is in its first position ('open'), the first syringe pump 9 is configured to dispense buffer fluid, and the unit 72 is configured to aspirate, resulting in a flow of buffer fluid from the first syringe pump 9 through the third subsidiary conduit 10' and the seventh selection valve 38' and the first portion 5a' of the third conduit 5' into the second flow cell 2'. With respect to the assembly 200 in FIG. 3, the buffer fluid flows from the second flow cell 2' through the first portion 15a' of the fourth conduit 15', the fourth subsidiary conduit 20' and the second subsidiary conduit 20 into the unit 72. With respect to the assembly 300 in FIG. 4, the buffer fluid flows from the second flow cell 2' through the fifth conduit 16 and the second subsidiary conduit 20 into the unit 72. Thus the buffer liquid which was released by the first syringe pump 9 into the second flow cell 2' will collect, within the second flow cell 2', the molecules which have become dissociated (i.e. passively dissociated) from the second ligands 4'; the buffer fluid containing the collected dissociated molecules, will flow from the second flow cell 2' into the collection reservoir 39 of the unit 72.

The fluid (buffer fluid in the case of passively disassociating molecules, or, regeneration fluid in the case of actively disassociating molecules) which has been collected in the collection reservoir 39 of the unit 72 can be provided to an analytical device which is configured to determine/identify the molecules which are present in the fluid; and thus ultimately determine/identify the molecules which were bound to the ligands within the addressed flow cells and became dissociated from the respective ligands.

In one example, the flow steering valve unit 138 is configured so that the sample fluid flows through both the first flow cell 2 and the second flow cell 2'. Said sample fluid most preferably contains molecules which actively or passively dissociates from both the first ligands 4 within the first flow cell 2 and the second ligands 4' within the second flow cell 2'. In this example, the flow steering valve unit 138 is first configured to be in its fifth state. The unit 72 is then configured to release sample fluid into the second waste reservoir 27. With respect to the assembly 200 in FIG. 3, the sample fluid follows two sample preparation paths; on a first sample preparation path the sample fluid flows through the second subsidiary conduit 20, the second portion 15*b* of the second conduit 15 and the second selection valve 28 into the second waste reservoir 27; on a second sample preparation path the sample fluid flows through the second subsidiary conduit 20, the fourth subsidiary conduit 20', the second portion 15*b*' of the fourth conduit 15' and the fifth selection valve 28' into the second waste reservoir 27. With respect to the assembly 300 in FIG. 4, the sample fluid flows on both the first and second sample preparation paths through the second subsidiary conduit 20, the second portion 15*b* of the second conduit 15 and the second selection valve 28 into the second waste reservoir 27.

Optionally, next the plunger 9*a* is plunged into the receptacle 9*a* so that buffer fluid is released from the first syringe pump 9. With respect to both the assembly 200 of FIG. 3 and the assembly 300 of FIG. 4, the released buffer fluid follows along two sample preparation rinsing paths; a first sample preparation rinsing path and a second sample preparation rinsing path. With respect to both the assembly 200 of FIG. 3 and the assembly 300 of FIG. 4, on the first sample preparation rinsing path the buffer fluid flows out of the first syringe pump 9 through the first subsidiary conduit 10, the sixth selection valve 38 and the first portion 5*a* of the first conduit 5 into the first flow cell 2, and from the first flow cell 2 through the second conduit 15 and the second selection valve 28 into the second waste reservoir 27. With respect to the assembly 200 in FIG. 3, on the second sample preparation rinsing path the buffer fluid flows on a second sample preparation rinsing path out of the first syringe pump 9 through the third subsidiary conduit 10', seventh selection valve 38' and the first portion 5*a*' of the third conduit 5' into the second flow cell 2', and from the second flow cell 2' through the fourth conduit 15' and the fifth selection valve 28' into the second waste reservoir 27. With respect to the assembly 300 in FIG. 4, on the second sample preparation rinsing path, the buffer fluid flows on the second sample preparation rinsing path out of the first syringe pump 9 through the third subsidiary conduit 10', seventh selection valve 38' and the first portion 5*a*' of the third conduit 5' into the second flow cell 2', and from the second flow cell 2' through the fifth conduit 16 and a portion of the fourth conduit 15' and the second selection valve 28 into the second waste reservoir 27.

Thus, with respect to the assembly 200 in FIG. 3 during the above mentioned steps, the second subsidiary conduit 20 and the fourth subsidiary conduit 20' are effectively rinsed by the sample fluid; and with respect to the assembly 300 in FIG. 4 the second subsidiary conduit 20 is effectively rinsed by the sample fluid.

Next, the flow steering valve unit 138 is configured to be in its sixth state. The unit 72 is then configured to release sample into the first flow cell 2 along a first sample injection flow path; and also the released sample flows and into the second flow cell 2' along a second sample injection flow path. With respect to both the assembly 200 of FIG. 3 and the assembly 300 of FIG. 4, on the first sample injection flow path, the sample flows from the unit 72 into the first flow cell 2 through the second subsidiary conduit 20 and the first portion 15*a* of the second conduit 15, and from there through the first conduit 5 and the first selection valve 8 into the first waste reservoir 7. With respect to the assembly 200 in FIG. 3, on the second sample injection flow path, the sample fluid flows from the unit 72 through the second subsidiary conduit 20, the fourth subsidiary conduit 20', and the first portion 15*a*' of the fourth conduit 15' into the second flow cell 2', and from the second flow cell 2' through the third conduit 5' and the fourth selection valve 8' into the first waste reservoir 7. With respect to the assembly 300 in FIG. 4, on the second sample injection flow path, the sample fluid flows from the unit 72 through the second subsidiary conduit 20 and the fifth conduit 16 into the second flow cell 2', and from the second flow cell through the third conduit 5' and the fourth selection valve 8' into the first waste reservoir 7.

Thus at this stage both the first flow cell 2 and the second flow cell 2' contain sample fluid; the molecules in the sample fluid contained within the first and second flow cell 2, 2' can bind to the first and second ligands 4, 4' within the first and second flow cell 2, 2'.

Next, the flow steering valve unit 138 is then configured into its fifth state. The unit 72 is then configured to release buffer fluid; the release buffer fluid flows along a first sample rinse flow path and a second sample rinse flow path to the second waster reservoir 27. With respect to both the assembly 200 of FIG. 3 and the assembly 300 of FIG. 4, on the first sample rinse flow path the buffer fluid flows from the unit 72 to the second waste reservoir 27 through the second subsidiary conduit 20, the second portion 15*b* of the second conduit 15 and the second selection valve 28 to flush out sample fluid which is present in the second subsidiary conduit 20. With respect to the assembly 200 in FIG. 3, on the second sample rinse flow path, the buffer fluid flows through the second subsidiary conduit 20, the fourth subsidiary conduit 20', the second portion 15*b*' of the fourth conduit 15' and the fifth selection valve 28' into the second waste reservoir 27. With respect to the assembly 300 in FIG. 4, on the second sample rinse flow path, the buffer fluid flows through the second subsidiary conduit 20, the second portion 15*b* of the second conduit 15 and the second selection valve 28 into the second waste reservoir 27. Thus, at this stage, with respect to the assembly 200 in FIG. 3 and with respect to the assembly 300 in FIG. 4, the first and second flow cell 2, 2' contain sample fluid; during the above mentioned steps, the second subsidiary conduit 20 is effectively rinsed by the buffer fluid. With respect to the assembly 300 in FIG. 4, also the fourth subsidiary conduit 20' is effectively rinsed by the buffer fluid.

Next, optionally the flow steering valve unit 138 is configured into its sixth state, and the plunger 9*a* may be plunged into the receptacle 9*a* so that buffer fluid is released from the first syringe pump 9 into the first waste recipient 7, flowing along a first outlet cleaning flow path and a second outlet cleaning flow path. With respect to both the assembly 200 of FIG. 3 and the assembly 300 of FIG. 4, on the first outlet cleaning flow path, the buffer fluid flows from the first syringe pump 9 through the first subsidiary conduit 10 and the sixth selection valve 38, the second portion 5*b* of the first conduit 5 and the first selection valve 8 into the first waste recipient 7; on the second outlet cleaning flow path the buffer fluid flows from the first syringe pump 9 through the third subsidiary conduit 10' and the seventh selection valve 38', the second portion 5*b*' of the third conduit 5' and the fourth selection valve 8' into the first waste recipient 7.

Thus, at this stage, the first and second flow cells 2, 2' both contain sample fluid, and the remaining flow path is effectively rinsed by buffer fluid, with exception of the first portion 5*a* of the first conduit 5, the first portion 15*a* of the second conduit 15, the first portion 5*a*' of the third conduit 5', and the first portion 15*a*' of the fourth conduit 15'.

Next the flow steering valve unit 138 is then configured into its fifth state, then buffer fluid is released from the first syringe pump 9; with respect to both the assembly 200 of FIG. 3 and the assembly 300 of FIG. 4, the released buffer fluid flows from the first syringe pump 9, along a first quick rinse flow path, and into the first flow cell 2; and the released buffer fluid flows from the first syringe pump 9, along a second quick rinse flow path, and into the second flow cell 2'. With respect to both the assembly 200 of FIG. 3 and the assembly 300 of FIG. 4, on the first quick rinse flow path, buffer fluid flows from the first syringe pump 9 through the first subsidiary conduit 10, the first portion 5a of the first conduit 5, the first flow cell 2, the second conduit 15 and the second selection valve 28 into the second waste recipient 27. With respect to the assembly 200 in FIG. 3, on the second quick rinse flow path, buffer fluid flows from the first syringe pump 9 through the third subsidiary conduit 10', the seventh selection valve 38' and the first portion 5a' of the third conduit 5' into the second flow cell 2, and from the second flow cell 2' through the fourth conduit 15' and the fifth selection valve 28' into the second waste reservoir 27. With respect to the assembly 300 in FIG. 4, on the second quick rinse flow path, released buffer fluid flows from the first syringe pump 9 through the third subsidiary conduit 10', the seventh selection valve 38' and the first portion 5a' of the third conduit 5' into the second flow cell 2, and from the second flow cell 2' on the second quick rinse flow path through the fifth conduit 16 and a portion of the fourth conduit 15' and the second selection valve 28 into the second waste reservoir 27. In the preferred embodiment, and in particular for recovering passively dissociating molecules, the buffer fluid is allowed to flow through the first and second flow cell 2,2' for a period between 10 milliseconds and 10 seconds; preferably, the buffer fluid is allowed to flow through the first and second flow cell 2,2' for a period between 0.1-2 seconds; most preferably the buffer fluid is allowed to flow through the first and second flow cell 2,2' for a period of 0.5 seconds.

Next the sixth selection valve 38 is moved into its first position ('open') and the seventh selection valve 38' is moved into its first position ('open'), so that a fluid can flow from or to the first syringe pump 9 through the first and second flow cell 2, 2' via the sixth selection valve 38 and seventh selection valve 38', respectively.

Next, for recovering actively dissociating molecules, the unit 72 is configured to release regeneration fluid, and the first syringe pump 9 is configured to aspirate the regeneration fluid from the unit 72 through the first flow cell 2 on a first regeneration flow path, and through the second flow cell 2' on a second regeneration flow path. With respect to both the assembly 200 of FIG. 3 and the assembly 300 of FIG. 4, on the first regeneration flow path, the regeneration fluid flows from the unit 72 through the second subsidiary conduit 20, the first portion 15a of the second conduit 15, into the first flow cell 2. With respect to the assembly 200 of FIG. 3, on the second regeneration flow path, the regeneration fluid flows through from the unit 72 through the second subsidiary conduit 20, the fourth subsidiary conduit 20', into the first portion 15a' of the fourth conduit 15', and into the second flow cell 2'. With respect to the assembly 300 of FIG. 4, on the second regeneration flow path, the regeneration fluid flows from the unit 72 through the second subsidiary conduit 20 and the fifth conduit 16 into the second flow cell 2'. The regeneration fluid forces the molecules which have been bound to the ligands 4,4' in the first and second flow cell 2,2' to become disassociated from the second ligands 4'. The regeneration fluid flows on the first regeneration flow path from the first flow cell 2 through the first portion 5a of the first conduit 5, the first subsidiary conduit 10 and the sixth selection valve 38 until it reaches the first syringe pump 9; on the second regeneration flow path the regeneration fluid flows from the second flow cell 2' to the first portion 5a' of the third conduit 5', the third subsidiary conduit 10' and the seventh selection valve 38' up to the first syringe pump 9. Importantly, as the regeneration fluid flows through the first and second flow cell 2,2' it will cause molecules which are bound to the respective first and second ligands 4,4' in the first and second flow cell 2,2' to become disassociated from their first and second ligands 4,4', respectively. The disassociated molecules will collect in the regeneration fluid which flows through the first and second flow cell 2,2'. Accordingly after this step the regeneration fluid which is present in the first flow cell 2, the first portion 5a of the first conduit 5 and the first subsidiary conduit 10 will contain molecules which were bound to and actively dissociated from the first ligands 4 in the first flow cell 2, and the regeneration fluid which is present in the second flow cell 2', the first portion 5a' of the third conduit 5' and the third subsidiary conduit 10' will contain molecules which were bound to and actively dissociated from the second ligands 4' in the second flow cell 2'.

Next, the first syringe pump 9 is configured to dispense buffer fluid, and the unit 72 is configured to aspirate, resulting in a flow of the regeneration fluid from before the first syringe pump 9 into the unit 72 on a first recovery flow path through the first flow cell 2, and on a second recovery flow path through the second flow cell 2'. With respect to both the assembly 200 of FIG. 3 and the assembly 300 of FIG. 4, on the first recovery flow path, the regeneration fluid flows from before the first syringe pump 9 through the first subsidiary conduit 10 and the first portion 5a of the first conduit 5 into the first flow cell 2, and from there through the first portion 15a of the second conduit 15 and the second subsidiary conduit 20 into the unit 72. With respect to the assembly 200 in FIG. 3, on the second recovery flow path, the regeneration fluid flows from before the first syringe pump 9 through the seventh selection valve 38' and the third subsidiary conduit 10' into the second flow cell 2', and from the second flow cell 2' through the first portion 5a' of the third conduit 5', the fourth subsidiary conduit 20', the second subsidiary conduit 20, and into the unit 72. With respect to the assembly 300 in FIG. 4, the dispense buffer fluid flows on the second recovery flow path from before the first syringe pump 9 through the seventh selection valve 38' and the third subsidiary conduit 10' into the second flow cell 2', and from the second flow cell 2' through the fifth conduit 16, the second subsidiary conduit 20, and into the unit 72. Thus, the regeneration fluid containing the dissociated molecules from both the first and second flow cells 2,2' may be collected in the collection reservoir 39 of the unit 72.

In case of passively dissociating molecules no regeneration fluid is used in the assemblies 200,300 because the molecules will passively disassociate from the first and second ligands 4,4' in the first and second flow cell 2,2', respectively, without the need to be actively disassociated by a regeneration fluid. Therefore, for recovering passively dissociating molecules, when the sixth selection valve 38 is in its first position ('open') and the seventh selection valve 38' is in its first position ('open'), the first syringe pump 9 is configured to dispense buffer fluid, and the unit 72 is configured to aspirate, resulting in a flow of buffer fluid on the first and second recovery flow paths. Thus the buffer liquid which was released by the first syringe pump 9 into the first flow cell 2 will collect, within the first flow cell 2, the molecules which have become dissociated (i.e. passively dissociated) from the first ligands 4, and the buffer liquid which was released by the first syringe pump 9 the into the second flow cell 2' will collect, within the second flow cell 2', the molecules which have become dissociated (i.e. passively dissociated) from the second ligands 4'; the buffer fluid containing the collected dissociated molecules, will flow from the first and second flow cell 2,2' into the collection reservoir 39 of the unit 72.

The fluid (buffer fluid in the case of passively disassociating molecules, or, regeneration fluid in the case of actively disassociating molecules) which has been collected in the collection reservoir 39 of the unit 72 can be provided to an analytical device which is configured to determine/identify the molecules which are present in the fluid; and thus ultimately determine/identify the molecules which were bound to the ligands within the addressed flow cells and became dissociated from the respective ligands.

In the preferred embodiment the microfluidic assemblies 100, 200, 300 furthermore comprise a sensor (such as a Surface Plasmon Resonance sensor, or, Waveguide interferometry sensor, or, surface acoustic sensor) which is configured to measure if molecules have become bound to the ligands within the first flow cell 2 and second flow cell 2', and is preferably configured to measure the number of molecules which are bound to said ligands; said sensor is preferably operable connected to the first flow cell 2 and the second flow cell 2' so that it can perform such measurements.

In a variation of the above assemblies 200 or 300, additional flow cells may be provided (i.e. in addition to the first and second flow cells 2,2') in the assemblies 200, 300, in order to provide more surfaces of ligands for testing. Preferably the type of ligands may provided in each of the plurality of flow cells may differ between the flow cells. Also, said flow cells may be integrated into a removable cartridge in order to allow quick replacement of used, clogged or dirty flow cells.

Figure 5:
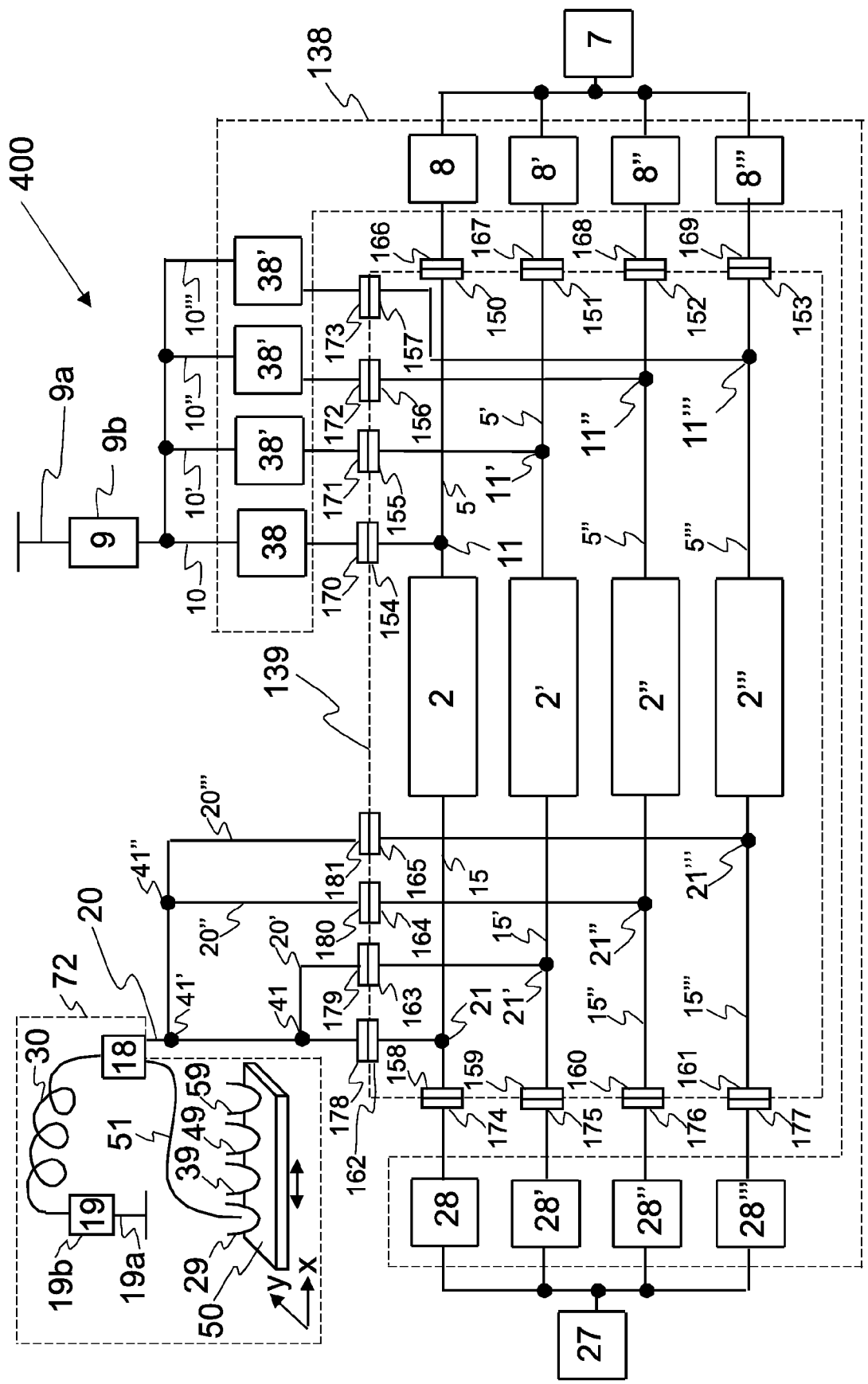
FIG. 5 provides a schematic view of a microfluidic assembly according to another embodiment of the present invention.

FIG. 5 illustrates a microfluidic assembly 400 according to a further embodiment of the present invention; the microfluidic assembly 400 has many of the same features as the microfluidic assembly 200 shown in FIG. 3 and like features are awarded the same reference numbers. The microfluidic assembly 400 further comprises a third flow cell 2", and a fourth flow cell 2'''. However it will be understood that the microfluidic assembly 400 may comprise any number of flow cells greater than two. Preferably the type of ligands provided in each of the flow cells 2,2',2",2''' differs between the flow cells 2,2',2",2'''; thus each flow cell is suitable to detect a different type of molecule. One end of the third flow cell 2" is connected to the second waste reservoir 27 through an eighth conduit 15" and a tenth selection valve 28", and connected by means of an eighth junction 21" and through a seventh subsidiary conduit 20" and the second subsidiary conduit 20 to the unit 72. The other end of the third flow cell 2" is connected to the first waste reservoir 7 through a sixth conduit 5" and an eighth selection valve 8", and connected by means of a tenth junction 11" and through a fifth subsidiary conduit 10" and a twelfth selection valve 38" to the first syringe 9. One end of the fourth flow cell 2''' is connected to the second waste reservoir 27 through a ninth conduit 15''' and an eleventh selection valve 28''', and connected by means of a ninth junction 21''' and through an eight subsidiary conduit 20''' and the second subsidiary conduit 20 to the unit 72. The other end of the fourth flow cell 2''' is connected to the first waste reservoir 7 through a seventh conduit 5''' and a ninth selection valve 8''', and connected by means of an eleventh junction 11''' and through a sixth subsidiary conduit 10''' and a thirteenth selection valve 38''' to the first syringe 9. The eight subsidiary conduit 20''' is connected on one end to the ninth conduit 15''' at a junction 21''', and on the other end to the second subsidiary conduit 20 at a junction 41'. The seventh subsidiary conduit 20" is connected on one end to the eighth conduit 15" at a junction 21", and on the other end to the eight subsidiary conduit 20''' at a junction 41".

Advantageously, the microfluidic assemblies 200, 300, 400 allows sample fluid flowing from the unit 72, or buffer fluid flowing from the first syringe pump 9, to reach all flow cells at the same time when injected into the flow cells. This is an advantage over existing microfluidic assemblies where the flow cells are arranged in series, and wherein any sample flowing from the unit 72 to the first and second flow cells 2,2' must first pass through the first flow cell 2 before passing through the second flow cell 2'. A simultaneous injection into the flow cells is especially important when measuring interactions with short time constants, such as fast dissociation rates in the order of 1 s−1 to 10 s−1. As an example, referring to FIG. 5, a first ligand of interest for which a binding with a target molecule is to be tested is captured within the first flow cell 2, and negative control ligands are captured on the second flow cell 2', the third flow cell 2" and the fourth flow cell 2'''. When moving the fourth selection valve 8', the eighth selection valve 8" and the ninth selection valve 8''' into the first position to allow fluid to pass from the unit 72 through all flow cells to the first waste reservoir 7, said sample reaches the flow cells at approximately the same time. Thereby, signals obtained from a sensor attached to the flow cells and adapted to measure the binding of molecules present in sample fluid to the different ligands in the flow cells, will not show significant time difference in the binding signals, eliminating artefacts such as spikes in a difference signal which can significantly impact analysis of the binding signals.

Continuing with the embodiment illustrated in FIG. 5, the microfluidic assembly 400 furthermore comprises a cartridge 139 In the preferred embodiment the cartridge 139 is a removable, disposable, cartridge 139. In what follows, the parts of the microfluidic assembly 400 outside of the cartridge 139 will be referenced to as fixed part of the assembly. The cartridge 139 is preferably a disposable cartridge; in one embodiment the cartridge is a single-use cartridge meaning that after one single use the cartridge is no longer useful and should be disposed and replaced with a new cartridge. Preferably the cartridge comprises connecting means which allows the cartridge to be selectively connected to or disconnected to the fixed part of the assembly; preferably the fixed part of the assembly comprises a first connecting means (e.g. a female member) and the cartridge comprises a second connecting means (e.g. a male member which is configured such that it can mechanically cooperate with the female member on the fixed part) which can cooperate with the first connecting means so as to hold the cartridge in connection with the fixed part. The cartridge comprises the first flow cell 2, the second flow cell 2', and the third flow cell 2". It furthermore comprises the fourth flow cell 2''', the second junction 21, the fourth junction 21', the eighth junction 21", the ninth junction 21''', the first junction 11, the third junction 11', the tenth junction 11", and the eleventh junction 11'''. The cartridge comprises a plurality of fluidic interfaces 150-165, and the fixed part comprises a corresponding number of plurality of matching fluidic interfaces 166-181. The fluidic interfaces are provided within the conduits leading to and from the flow cells, effectively dividing the conduits into a part located within the cartridge and a part located within the fixed part. Within the first conduit 5, a first fluidic interface 150 is provided on the cartridge and a seventeenth fluidic interface 166 is provided on the fixed part; within the third conduit 5', a second fluidic interface 151 is provided on the cartridge and a eighteenth fluidic interface 167 is provided on the fixed part; within the sixth conduit 5", a third fluidic interface 152 is provided on the cartridge and a nineteenth fluidic interface 168 is provided on the fixed part; within the seventh conduit 5'", a fourth fluidic interface 153 is provided on the cartridge and a twentieth fluidic interface 169 is provided on the fixed part; within the first subsidiary conduit 10, a fifth fluidic interface 154 is provided on the cartridge and a twenty-first fluidic interface 170 is provided on the fixed part; within the third subsidiary conduit 10', a sixth fluidic interface 155 is provided on the cartridge and a twenty-second fluidic interface 171 is provided on the fixed part; within the fifth subsidiary conduit 10", a seventh fluidic interface 156 is provided on the cartridge and a twenty-third fluidic interface 172 is provided on the fixed part; within the sixth subsidiary conduit 10'", an eight fluidic interface 157 is provided on the cartridge and a twenty-fourth fluidic interface 173 is provided on the fixed part; within the second conduit 15, a ninth fluidic interface 158 is provided on the cartridge and a twenty-fifth fluidic interface 174 is provided on the fixed part; within the fourth conduit 15', a tenth fluidic interface 159 is provided on the cartridge and a twenty-sixth fluidic interface 175 is provided on the fixed part; within the eighth conduit 15", an eleventh fluidic interface 160 is provided on the cartridge and a twenty-seventh fluidic interface 172 is provided on the fixed part; within the ninth conduit 15'", a twelfth fluidic interface 161 is provided on the cartridge and a twenty-eighth fluidic interface 177 is provided on the fixed part; within the second subsidiary conduit 20, a thirteenth fluidic interface 162 is provided on the cartridge and a twenty-ninth fluidic interface 178 is provided on the fixed part; within the fourth subsidiary conduit 20', a fourteenth fluidic interface 163 is provided on the cartridge and a thirtieth fluidic interface 179 is provided on the fixed part; within the seventh subsidiary conduit 20", a fifteenth fluidic interface 164 is provided on the cartridge and a thirty-first fluidic interface 180 is provided on the fixed part; within the eighth subsidiary conduit 20'", a sixteenth fluidic interface 165 is provided on the cartridge and a thirty-second fluidic interface 181 is provided on the fixed part. When the cartridge is connected to the fixed part the fluidic interfaces 150-165 on the cartridge cooperate with corresponding fluidic interfaces 166-181 on the fixed part so that the cartridge is fluidly connected to the fixed part and the corresponding conduits are sealed in order to allow a pressure-driven flow without leakage. In a preferred embodiment, the fluidic interfaces between the removable cartridge and the fixed part of the assembly comprises one or several seals made of an elastomeric compound with high chemical resistance to acids, bases and solvents, such as EPDM or FFK or a silicone so as to provide a fluid-impermeable seal when the interfaces cooperate, while still allowing the cartridge to be easily detached from the fixed part if desired.

Figure 6:
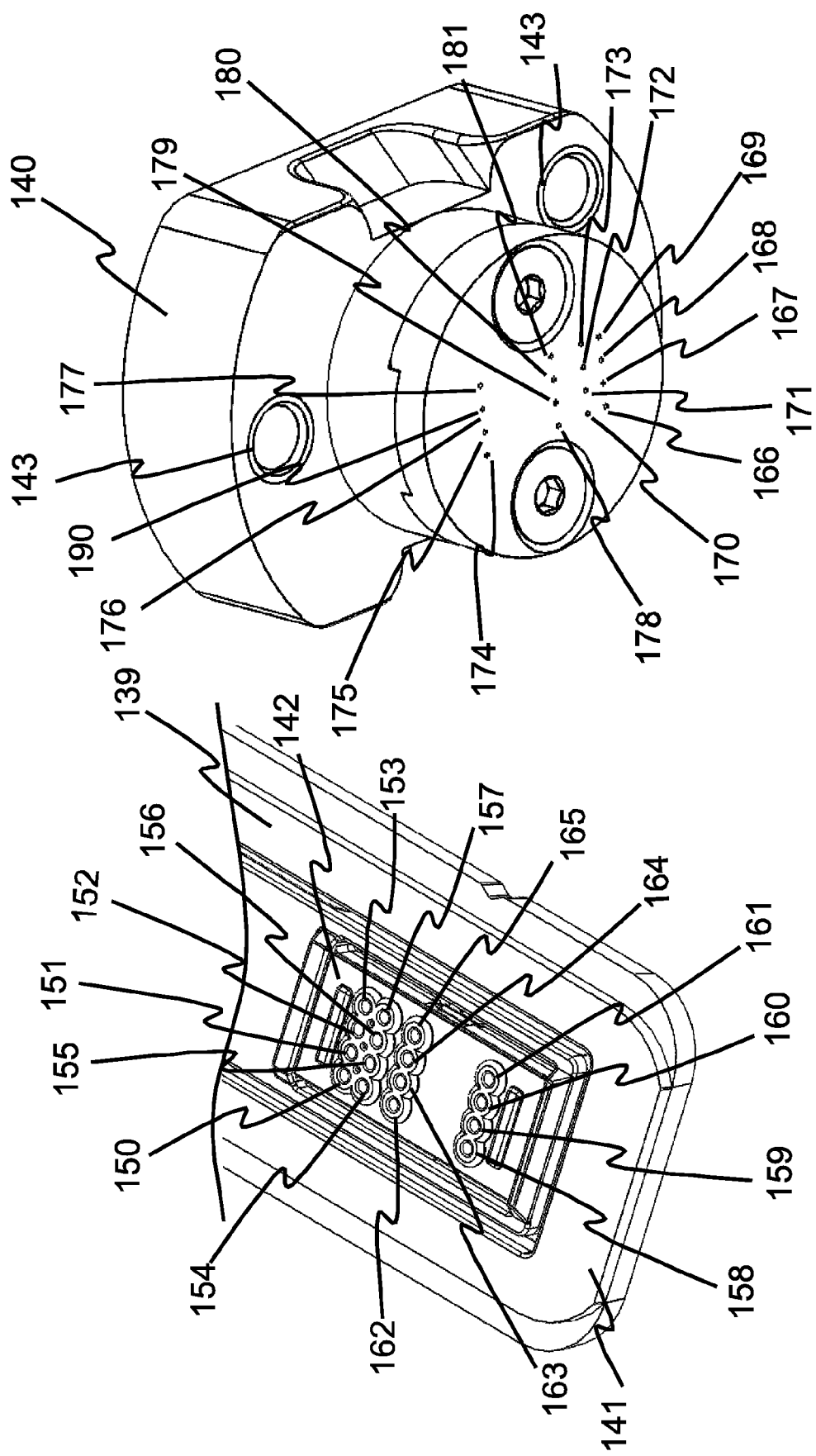
FIG. 6a provides a perspective view of a portion of a disposable cartridge and FIG. 6b provides a perspective view of a plunger, wherein the disposable cartridge and pluger can mechanically cooperate with one another to form a microfluidic assembly according to the present invention.

FIG. 6a shows a partial perspective-top view of the cartridge 139, used in the microfluidic assembly 400 of FIG. 5, which comprises the fluidic interfaces 150-165. Each fluidic interface 150-165 comprises a ring member made of an elastomeric compound such as EPDM, FKM or silicone. FIG. 6b shows a perspective-bottom view of a plunger assembly 140 which forms part of the fixed part of the microfluidic assembly 400 of FIG. 5. The plunger assembly 140 is suitable for cooperating with the cartridge 139. The plunger assembly 140 further comprises fluidic channels 190 having positions corresponding the positions fluidic interfaces 150-165 provided in the cartridge 139; the respective rim at the open end of each fluidic channel 190 defines a corresponding interface 166-181. The number of fluidic channels preferably corresponds to the number of fluidic interfaces 150-165 provided on the cartridge.

The cartridge 139 comprise a main body 141, the main body 141 may be injected molded, preferably comprising a thermoplastic material such as Polycarbonate or Cyclic Olefin Copolymer Preferably the plunger assembly comprises hard and inert material with high resistance to chemicals, for example precision machined or polished stainless steel or PEEK.

The plunger assembly 140 comprises linear bearings 143 which allow it to be movable in a direction perpendicular to the plane of fluidic interfaces 150-165 of the cartridge; in particular, the plunger assembly 140 can be moved to abut the cartridge so as to bring the respective rim at the open end of each fluidic channel 190 which defines a corresponding interface 166-181, into abutment with a corresponding ring member with defines a respective fluidic interface 150-165 on the cartridge. The plunger assembly 140 and cartridge 139 may be maintained in such a position (i.e. a position where by the interfaces are aligned and abut) by means of a pinion such as a stainless steel bolt, or a spring.

Preferably, the plunger assembly 140 is positioned so that the respective rims at the open end of each fluidic channel 190 which defines a corresponding interface 166-181, abut respective ring members on the cartridge 139 with define respective fluidic interface 150-165 form a fluid-impermeable seal between the fluidic interfaces 150-165 on the cartridge 139 and the fluidic interfaces 166-181 on the plunger assembly 140. Preferably the plunger assembly 140 is positioned so that the respective rims at the open end of each fluidic channel 190 which defines a corresponding interface 166-181, compress respective ring members on the cartridge 139 with define respective fluidic interface 150-165 form a fluid-impermeable seal between the fluidic interfaces 150-165 on the cartridge 139 and the fluidic interfaces 166-181 on the plunger assembly 140. As an example, the respective rim at the open end of the fluidic channel 190 which defines the twenty-fifth fluidic interface 174 is pressed onto the small rings forming the ninth fluidic interface 158, thereby combining and sealing the cartridge part of the second conduit 15 and the fixed parts of the second conduit 15. When moving the plunger assembly 140 away from the cartridge, the fluidic interfaces are separated allowing easy removal and disposable and replacement of the cartridge 139.

In the depicted embodiment, the fluidic interfaces 150-165 on the cartridge 139 comprise rings of elastomeric material; preferably the rings are provided as a single substrate and that single substrate is attached to the main body 141 of the cartridge 139; the centre of each ring is aligned with a respective hole which is defined in the main body 141. In a further preferred embodiment, the fluidic interfaces 150-165 are formed integral to the main body 141 of the cartridge 139; in such an embodiment the main body 141 and the fluidic interfaces 150-165 may both be formed from a single injection molded part; the single injection molded part may comprise dual materials and integrated elastomeric ring seals.

Figure 7:
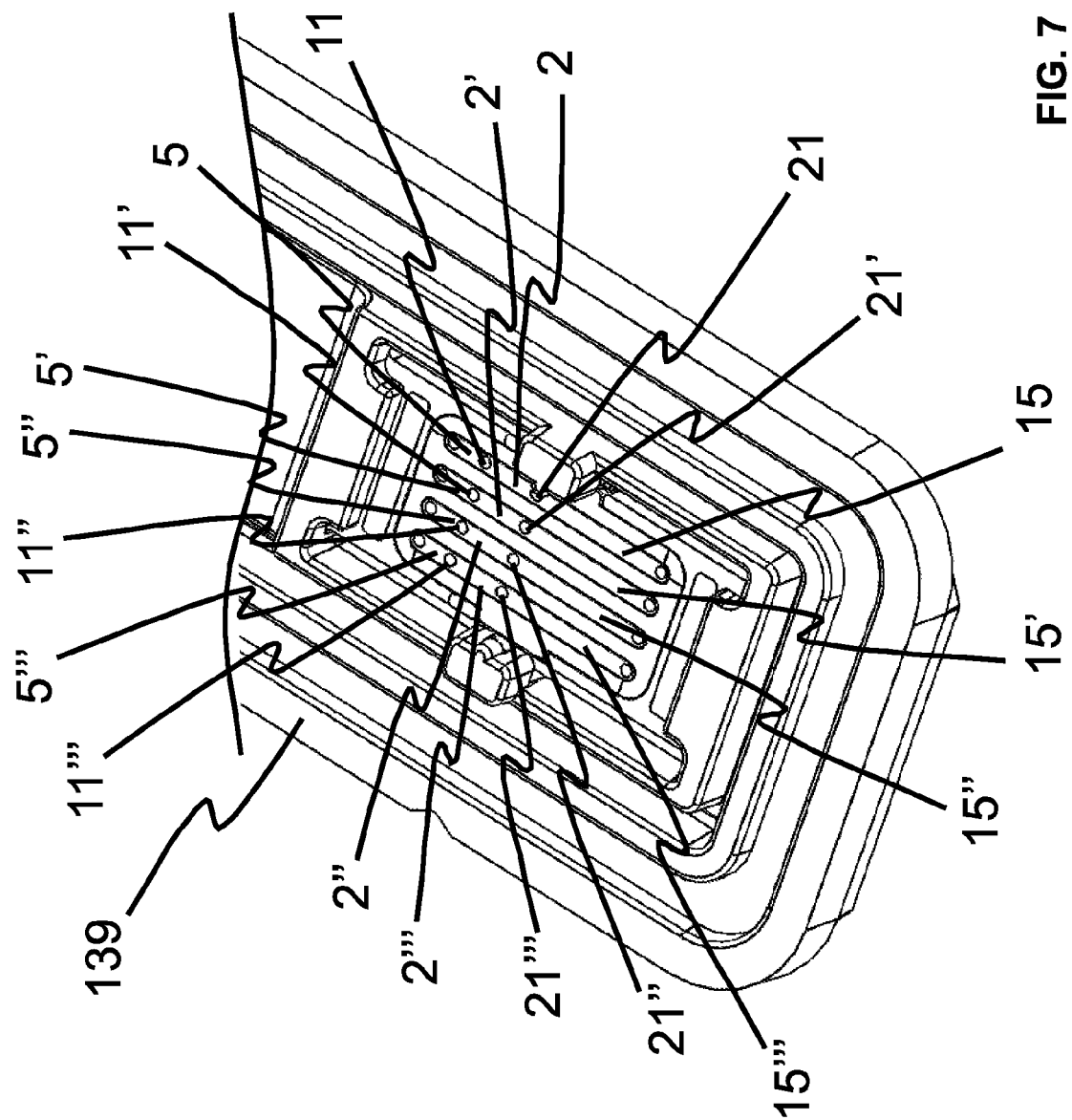

FIG. 7 shows the partial bottom view of the cartridge 139 shown in FIG. 6a. The conduits 5, 5', 5", 5'", 15, 15', 15", 15'" are formed as rectangular channels in the cartridge 139, and the junctions 11, 11', 11", 11'", 21, 21', 21", 21'" are T-shaped junctions formed by circular holes connecting the respective channels with the respective fluidic interfaces on the top side of the cartridge 139.

Advantageously, the microfluidic assembly 400 does not contain any valves within the removable cartridge, reducing the cost of the removable cartridge which needs often replacement to supply fresh surfaces with the flow cells for capturing new ligands.

Advantageously, the microfluidic assembly 400 can be easily replaced in case any of the flow cells would clog, such as due to sample fluid containing large particles such as cell debris or due to sample fluid such as blood serum containing a large amount of proteins, thus reducing maintenance costs and down time of a measurement device containing the microfluidic assembly 400.

Advantageously, the microfluidic assemblies 200, 300, 400 do not contain any valves in the flow path between the unit 72 and the flow cells. Thus no inner valve volume needs to be rinsed, reducing sample consumption.

In a variation of the embodiments illustrated in FIGS. 2 through 5, the microfluidic assemblies 100, 200, 300 or 400 comprise a single waste reservoir only. For example, in a variation of said embodiments the assemblies 1 do not comprise a second waste reservoir 27; instead the conduits leading to the second waste reservoir in the Figures lead to the first waste reservoir 7. Advantageously in this variation of the embodiment the microfluidic assembly 1 comprises a lower number of waste reservoirs.

Various modifications and variations to the described embodiments of the invention will be apparent to those skilled in the art without departing from the scope of the invention as defined in the appended claims. Although the invention has been described in connection with specific preferred embodiments, it should be understood that the invention as claimed should not be unduly limited to such specific embodiment.

For example the one of more flow cells which are provided in the assemblies 1, 100,200,300,400 may be provided in a cartridge. In other words the assemblies 1, 100,200, 300,400 may comprise a cartridge which comprises the flow cell(s) 2,2',2",2'". Preferably the cartridge is a disposable cartridge. Preferably the cartridge comprises connecting means which allows the cartridge to be selectively connected to the assembly or removed from the assembly.

For example, in a variation of any of the exemplary methods described with respect to FIG. 1, 2, 3 or 4 above, the method include the additional preceding step of preparing a sample fluid which is to be tested and which is to be provided in the sample reservoir 29. The step of preparing the sample fluid to be tested may comprise pooling a plurality of different fluids directly in the sample reservoir 29; or pooling a plurality of different fluids in a receptacle and then transferring the contents of the receptacle into the sample reservoir 29. Thus in this embodiment the sample fluid is made up of a plurality of different fluids which are mixed together to define the sample fluid to be tested. Preferably one or more of the different fluids which are pooled together to form the sample fluid contain compounds which are expected to bind to the first ligands 4 in the first flow cell 2.

In another example, in a variation of any of the exemplary methods described with respect to FIG. 1, 2, 3 or 4 above, the method may further comprise the step of monitoring whether or not molecules have bound to first ligands 4 in the first flow cells 2. In this case, said buffer fluid which is delivered into collection reservoir 39 (assembly 1 of FIG. 1), or said regeneration fluid which is delivered into collection reservoir 39 (assembly 100 of FIG. 2), is provided to an analytical device for analysis only if the monitoring indicates that molecules have bound to first ligands 4 in the first flow cells 2, otherwise the buffer fluid, or said regeneration fluid, which is delivered into collection reservoir 39 is not passed on to the analytical device. Advantageously, in this embodiment resources are optimally used since resources at the analytical device are used only when molecules have become bound to first ligands 4.

In another example, in either of the assemblies 1, 100, 200, 300 shown in FIG. 1, 2, 3 or 4, some or all of the conduits of the assembly 1, 100, 200, 300 could be by microfluidic channels with rectangular cross-section (typically in first flow cells or sensors) or microfluidic channels with circular cross-section. The conduits of the assembly 1, 100, 200, 300 may be defined by tubing or capillaries comprising materials such as PEEK or PTFE or Steel.

It should be understood that the first and second selection valves 8,28 may take any suitable form. In another example, the selection valves in the assembly (e.g. first and second selection valves 8,28) may comprise a solenoid valve or a rotary valve.

It should be understood that any suitable pump can be used in the assemblies 1, 100,200, 300, instead of the syringe pumps (instead of the first and second syringe pumps 9, 19); for example peristatic pumps, piezo-electric pumps, or pumps operated using pneumatic pressure, may be provided in the assembly instead of the syringe pumps.

It should be understood that the reservoirs (for example the sample reservoir 29, collection reservoir 39, waste reservoir 7,27,49, elution reagent reservoir 59 etc.) used in the assemblies 1, 100, 200, 300 may take any suitable form; for example one or more of the reservoirs may be defined by one or more vials or microtiterplates.

The invention claimed is:

1. An assembly which can be used for recovering molecules in a sample, the assembly comprising, a first flow cell which comprises first ligands which can bind to molecules;

at least one waste reservoir which is connected to a first fluid port of the first flow cell via a first conduit, and a second conduit which connects at least one of said at least one waste reservoir to a second fluid port of the first flow cell; and a first valve arranged to control the fluid communication between the first conduit and at least one of said at least one waste reservoir, and a second valve to control the fluid communication between the second conduit and at least one of said at least one waste reservoir;

a first buffer reservoir which can hold buffer fluid, fluidly connected to the first conduit via a first subsidiary conduit, wherein the first subsidiary conduit connects to the first conduit at a first junction which is located between the first fluid port of the first flow cell and the first valve, and wherein buffer fluid can be selectively supplied from the first buffer reservoir into the first subsidiary conduit;

a unit which comprises a collection reservoir, and a sample reservoir which can hold sample fluid, and a second buffer reservoir which can hold buffer fluid, wherein said unit is fluidly connected to the second conduit via a second subsidiary conduit, wherein the second subsidiary conduit connects to the second conduit at a second junction which is located between the second fluid port of the first flow cell and the second valve; and a storage conduit which fluidly connects the second buffer reservoir to a third valve, and wherein the third valve is operable to selectively, fluidly connect the storage conduit to the second subsidiary conduit, or fluidly connect the collection reservoir to the second subsidiary conduit, or fluidly connect the sample reservoir to the second subsidiary conduit.

2. An assembly according to claim 1 wherein the first buffer reservoir comprises a first syringe pump, and the second buffer reservoir comprises a second syringe pump.

3. An assembly according to claim 1 wherein the second junction is located closer to the second fluid port of the first flow cell than to the second valve.

4. An assembly according to claim 1 wherein the first junction is located closer to the first fluid port of the first flow cell than to the first valve.

5. An assembly according to claim 1 further comprising, a second flow cell, and a selection valve between a first port of the second flow cell and one of said at least one waste reservoir, a selection valve between the first buffer reservoir and said first junction; and a selection valve between a third junction and a fourth junction, wherein said fourth junction is between the first buffer reservoir and said selection valve which is between the first buffer reservoir and the first junction, and said third junction is between said first port of the second flow cell and said selection valve between the first port of the second flow cell and the one of said at least one waste reservoir.

6. An assembly according to claim 1 wherein the first flow cell is provided in a cartridge, and wherein the cartridge comprises a connecting means which can be selectively arranged to cooperate with a connecting means provided on a fixed part of the assembly, so that the cartridge can be selectively connected or disconnected from the fixed part of the assembly.

7. A method of molecule recovery using an assembly according to claim 1;
the method comprising the steps of,
(a) flowing a sample fluid along the second subsidiary conduit and second conduit into the first flow cell;
(b) flowing the buffer fluid through the second subsidiary conduit and the second conduit into the at least one waste reservoir, without flowing any of the buffer fluid through the first flow cell so that sample fluid is maintained in the first flow cell but said second subsidiary conduit and the second conduit are cleaned by the buffer fluid;
(c) flowing the buffer fluid through the first flow cell to flush the sample fluid out of the first flow cell, leaving molecules from the sample fluid, which became bound to the first ligands, in the first flow cell;
(d) flowing a fluid through the first flow cell and into the collection reservoir, so that molecules of the sample fluid which were bound to first ligands and which have become dissociated from the first ligands are collected into the fluid which flows through the first flow cell and are brought to the collection reservoir.

8. A method according to claim 7, wherein said step (d) comprises,
flowing the buffer fluid through the first flow cell, and into the collection reservoir, so that molecules of the sample fluid which were bound to first ligands and which have dissociated from the first ligands, are collected into the buffer fluid which flows through the first flow cell and are brought to the collection reservoir.

9. A method according to claim 7 wherein said
step (c) of flowing the buffer fluid through the first flow cell to flush the sample fluid out of the first flow cell, comprises flowing the buffer fluid through the first flow cell for a period between 10 milliseconds and 10 seconds.

10. A method according to claim 7 wherein the method further comprises the steps of,
flowing the buffer fluid out of the first buffer reservoir, along the first subsidiary conduit, and into the at least one waste reservoir; wherein
step (c) comprises flowing the buffer fluid out of the first buffer reservoir, along the first subsidiary conduit, through the first flow cell, along the second conduit and into the at least one waste reservoir, so as to flush the sample fluid out of the first flow cell; and wherein
step (d) comprises collecting into the buffer fluid, which flows in the first flow cell, molecules which have passively dissociated from first ligands in the first flow cell; and
collecting, via the second subsidiary conduit, the buffer fluid which contains said molecules into the collection reservoir.

11. A method according to claim 7, wherein
step (a) comprises flowing the sample fluid along the second subsidiary conduit, through the first flow cell, along the first conduit and into the at least one waste reservoir;
step (c) comprises flowing the buffer fluid out of the first sample buffer reservoir, along the first subsidiary conduit, through the first flow cell, and along the second conduit, and into the at least one waste reservoir;
step (b) comprises flowing the buffer fluid out of the second buffer reservoir, along the second subsidiary conduit, and into the at least one waste reservoir; and
step (d) comprises flowing a regeneration fluid along the second subsidiary conduit and into the first flow cell, wherein the regeneration fluid causes the molecules which are bound to the first ligands in the first flow cell to dissociate from the first ligands and collect in the regeneration fluid;
flowing the buffer fluid out of the second buffer reservoir, along the second subsidiary conduit, and into the at least one waste reservoir; and
collecting, via the second subsidiary conduit, the regeneration fluid which contains said molecules into the collection reservoir.

12. A method according to claim 7 further comprising the step of preparing the sample fluid by, pooling a plurality of different fluids in the sample reservoir or a receptacle.

* * * * *